United States Patent
Chen et al.

(10) Patent No.: US 11,667,302 B2
(45) Date of Patent: Jun. 6, 2023

(54) AUTOMATED VEHICLE SAFETY RESPONSE METHODS AND CORRESPONDING VEHICLE SAFETY SYSTEMS WITH SERIALIZED COMPUTING ARCHITECTURES

(71) Applicant: Pony AI Inc., Grand Cayman (KY)

(72) Inventors: Bokai Chen, Fremont, CA (US); Qi Wang, Fremont, CA (US); Daniel Yang, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 153 days.

(21) Appl. No.: 17/120,211

(22) Filed: Dec. 13, 2020

(65) Prior Publication Data

US 2022/0185298 A1 Jun. 16, 2022

(51) Int. Cl.
*B60W 50/029* (2012.01)
*B60W 30/09* (2012.01)
(Continued)

(52) U.S. Cl.
CPC .......... *B60W 50/029* (2013.01); *B60W 30/09* (2013.01); *B60W 30/12* (2013.01); *B60W 50/0205* (2013.01); *G07C 5/02* (2013.01); *H04L 67/12* (2013.01); *B60W 60/0015* (2020.02); *B60W 2050/0295* (2013.01);
(Continued)

(58) Field of Classification Search
CPC .. B60W 30/09; B60W 30/12; B60W 50/0205; B60W 60/0015; B60W 2050/0295; B60W 2400/00; B60W 2420/52; B60W 2554/4041;
(Continued)

(56) References Cited

U.S. PATENT DOCUMENTS 10,747,223 B1 9/2020 Eade et al.
11,169,521 B2 * 11/2021 Park .................... G05D 1/0061
(Continued)

FOREIGN PATENT DOCUMENTS

DE 102013003216 A1 9/2013
DE 102019115330 A1 12/2020

OTHER PUBLICATIONS

Extended European Search Report for EP Appln. No. 21211821.0 dated May 3, 2022, 8 pages.
(Continued)

*Primary Examiner* — Marthe Y Marc-Coleman

(57) ABSTRACT

Described herein are systems, methods, and non-transitory computer-readable media for implementing automated vehicle safety response measures to ensure continued safe automated vehicle operation for a limited period of time after a vehicle component or vehicle system that supports an automated vehicle driving function fails. When a critical vehicle component/system such as a vehicle computing platform fails, the vehicle is likely no longer capable of performing calculations required to safely operate and navigate the vehicle in an autonomous manner, or at a minimum, is no longer able to ensure the accuracy of such calculations. In such a scenario, the automated vehicle safety response measures disclosed herein can ensure—despite failure of the vehicle component/system—continued safe automated operation of the vehicle for a limited period of time in order to bring the vehicle to a safe stop.

18 Claims, 17 Drawing Sheets

(51) Int. Cl.
  *B60W 30/12* (2020.01)
  *B60W 50/02* (2012.01)
  *G07C 5/02* (2006.01)
  *H04L 67/12* (2022.01)
  *B60W 60/00* (2020.01)
  *G05D 1/00* (2006.01)

(52) U.S. Cl.
  CPC ..... *B60W 2400/00* (2013.01); *B60W 2420/52* (2013.01); *B60W 2554/4041* (2020.02); *B60W 2710/18* (2013.01); *B60W 2710/20* (2013.01); *G05D 1/0055* (2013.01)

(58) Field of Classification Search
  CPC ......... B60W 2710/18; B60W 2710/20; B60W 10/06; G07C 5/02; H04L 67/12; G05D 1/0055
  See application file for complete search history.

(56) References Cited

U.S. PATENT DOCUMENTS

| | | | |
|---|---|---|---|
| 11,332,158 | B2 | 5/2022 | Hecker et al. |
| 11,353,867 | B1* | 6/2022 | Eade .................. G05D 1/0257 |
| 2016/0368491 | A1 | 12/2016 | Hauler et al. |
| 2017/0269593 | A1 | 9/2017 | Letwin et al. |
| 2017/0291560 | A1 | 10/2017 | Schroeder et al. |
| 2019/0079513 | A1 | 3/2019 | Greenfield et al. |
| 2019/0118827 | A1 | 4/2019 | Khalifeh et al. |
| 2021/0107520 | A1 | 4/2021 | Oltmann et al. |

OTHER PUBLICATIONS

Extended European Search Report for EP Appln. No. 21211822.8 dated May 3, 2022, 7 pages.
Extended European Search Report for EP Appln. No. 21211824.4 dated May 3, 2022, 6 pages.

* cited by examiner

AUTOMATED VEHICLE SAFETY RESPONSE METHODS AND CORRESPONDING VEHICLE SAFETY SYSTEMS WITH SERIALIZED COMPUTING ARCHITECTURES

FIELD OF THE INVENTION

The present invention relates generally to techniques for automated vehicle safety response, and more particularly, in some embodiments, to techniques and corresponding vehicle computing architectures for implementing automated vehicle safety measures in response to vehicle system failures.

BACKGROUND

Modern vehicles are equipped with a host of features and functionality designed to enhance the effectiveness of the vehicle's safety response to potential safety hazards. Such hazards may be caused, for example, by characteristics associated with the external environment in which the vehicle operates such as weather hazards, obstacles in the road, or the like. An increasing number of vehicle driving functions are being automated, and with this increased automation comes a corresponding increase in the number and complexity of safety protocols needed to ensure continued safe vehicle operation after a vehicle component that supports an automated driving function fails. Described herein are technical solutions that address technical problems associated with current vehicle safety measures taken in response to failure of a vehicle component/system.

SUMMARY

Example embodiments of the invention relate to vehicle systems, methods, non-transitory computer-readable media, techniques, and methodologies for implementing automated vehicle safety response measures to ensure continued safe automated vehicle operation for a limited period of time after a vehicle component or vehicle system that supports an automated vehicle driving function fails. The vehicle may be, for example, an autonomous vehicle with at least partial automation of one or more driving functions. The autonomous vehicle may include a vehicle computing platform responsible for performing computationally intensive calculations in connection with tasks (e.g., object detection and perception) critical for safe autonomous vehicle operation. When a critical vehicle component/system such as a vehicle computing platform fails, the vehicle is likely no longer capable of performing calculations required to safely operate and navigate the vehicle in an autonomous manner, or at a minimum, is no longer able to ensure the accuracy of such calculations. In such a scenario, the automated vehicle safety response measures disclosed herein can ensure—despite failure of the vehicle component/system—continued safe automated operation of the vehicle for a limited period of time in order to bring the vehicle to a safe stop.

Vehicle safety systems and subsystems according to example embodiments of the invention may include corresponding vehicle computing architectures, such as serialized or combined serial-parallel computing architectures including one or more processors, that facilitate the automated vehicle safety response measures described herein. In example embodiments, a serial computing architecture may be provided that includes a main (primary) vehicle computing platform, a vehicle safety system, and a vehicle actuation system. The main computing platform, the vehicle safety system, and the vehicle actuation system may be configured for serialized communication, whereby the main computing platform generates and sends vehicle control commands to the vehicle safety system, which in turn, relays the control commands to the vehicle actuation system for implementation.

In example embodiments, the main vehicle computing platform may continuously send future vehicle trajectory information to the vehicle safety system in addition to the vehicle control commands. The future vehicle trajectory information may indicate a planned future trajectory for the vehicle for a limited period of time subsequent to receipt of the trajectory information. In the event of a main vehicle computing platform failure, for example, the vehicle safety system may utilize the future vehicle trajectory information received from the main computing platform just prior to failure to determine a set of vehicle safety response control commands that, when implemented by the vehicle actuation system, cause the vehicle to decelerate and come to a safe stop along the planned future vehicle trajectory. In some example embodiments, the vehicle safety system may receive sensor data from one or more sensors, which the vehicle safety system can use to augment the vehicle safety response control commands to help ensure that the vehicle maintains the desired trajectory during the automated stopping maneuver.

Vehicle safety systems and subsystems according to example embodiments of the invention may alternatively include a combined serial-parallel computing architecture that facilitates automated vehicle safety response measures disclosed herein. In an example embodiment, a serial-parallel computing architecture may include a main (primary) vehicle computing platform, a secondary vehicle computing platform, a vehicle safety system, and a vehicle actuation system. The primary vehicle computing platform and the secondary vehicle computing platform may each be configured to generate vehicle control commands and send the commands to the vehicle safety system, which in turn, may relay the control commands to the vehicle actuation system. The main vehicle computing platform and the secondary vehicle computing platform may each occupy a same (parallel) level in the serialized architecture.

In some example embodiments, the secondary vehicle computing platform may perform calculations/processing to generate vehicle control commands that at least partially enable automated driving functions. By virtue of its greater processing capacity/lower processing latency, for example, the main vehicle computing platform may perform a greater number and/or more computationally intensive calculations/processing than the secondary vehicle computing platform. Further, in some example embodiments, the secondary vehicle computing platform may be configured to handle a greater processing load and/or more computationally intensive tasks than the vehicle safety system. In such example embodiments, the secondary vehicle computing platform may be configured to generate one or more vehicle safety response control commands capable of initiating higher level (e.g., more complex) vehicle safety response measures in response to failure of the main computing platform. Such higher level vehicle safety response measures may include complex vehicle control commands—potentially augmented by sensor data—that, when implemented by the vehicle actuation system, cause the vehicle to execute at least one lane change maneuver to bring the vehicle to a stop in a slow lane or a shoulder of a roadway, for example. In an example scenario in which the main computing platform and the secondary computing platform both fail, the vehicle safety system may be configured to generate lower level vehicle commands to, for example, bring the vehicle to a stop along a planned trajectory indicated by the future vehicle trajectory data without requiring more complex driving tasks such as lane changes.

In example embodiments, a vehicle safety system may be associated with a corresponding vehicle safety response control level hierarchy that defines a hierarchy of vehicle safety response control levels capable of being supported by the vehicle safety system. One or more of the vehicle safety response levels in the hierarchy may be associated with a respective one or more vehicle component(s) that need to be operational in order to effectuate vehicle safety response measures corresponding to that vehicle safety response control level. The vehicle safety system may be configured to iterate through the hierarchy until a highest control level with corresponding vehicle component(s) needed to support that control level (if any) being in operational status is identified. The vehicle control level so identified may not necessarily be the highest overall control level in the hierarchy capable of being implemented by the vehicle safety system. In example embodiments, the identified control level may be selected as the current vehicle safety response control level, and the vehicle safety system may determine vehicle safety response control commands commensurate with the selected control level.

In an example embodiment, a computer-implemented method is disclosed. The method includes receiving, by one or more processors of a vehicle, future vehicle trajectory data from a vehicle computing platform of the vehicle; determining, by the one or more processors, that the vehicle computing platform has failed; determining, by the one or more processors, a set of vehicle safety response control commands based at least in part on the future vehicle trajectory data; and sending, by the one or more processors, the set of vehicle safety response control commands to one or more actuators of the vehicle to initiate a safety response measure for the vehicle in response to failure of the vehicle computing platform.

In an example embodiment, the future vehicle trajectory data is indicative of a planned trajectory of the vehicle for a period of time subsequent to a time of receipt of the future vehicle trajectory data.

In an example embodiment, determining that the vehicle computing platform has failed comprises receiving, by the one or more processors from the vehicle computing platform, a failure signal indicating that the vehicle computing platform has failed.

In an example embodiment, determining that the vehicle computing platform has failed comprises determining, by the one or more processors, that connectivity between the vehicle safety system and the vehicle computing platform has been lost for at least a threshold period of time.

In an example embodiment, determining the set of vehicle safety response control commands comprises processing the future vehicle trajectory data at the vehicle safety system to generate the set of vehicle safety response commands.

In an example embodiment, receiving, at the one or more processors, sensor data from one or more sensors of the vehicle; augmenting, by the one or more processors, the set of vehicle safety response control commands using the sensor data to obtain a set of augmented vehicle safety response control commands; and sending, by the one or more processors, the set of augmented vehicle safety response control commands to the vehicle actuation system to enhance the safety response measure for the vehicle.

In an example embodiment, the one or more sensors comprise an inertial sensor, wherein the sensor data comprises first sensor data received from the inertial sensor, and wherein augmenting the set of vehicle safety response control commands comprises: determining, by the one or more processors, a current location of the vehicle using the first sensor data; determining, by the one or more processors and based at least in part on the future vehicle trajectory data, that the current location of the vehicle deviates from an expected location of the vehicle; and modifying, by the one or more processors, a vehicle steering control command of the set of vehicle safety response control commands to obtain an augmented vehicle steering control command of the set of augmented vehicle safety response control commands, wherein the augmented vehicle steering control command, when implemented, causes the one or more actuators to adjust a steering control for the vehicle to reduce the deviation between the current location of the vehicle and the expected location of the vehicle.

In an example embodiment, the expected location of the vehicle corresponds to a center of a lane of a roadway being traversed by the vehicle, and wherein the augmented vehicle steering control command, when implemented, causes the one or more actuators to adjust the steering control to move the vehicle from the current location of the vehicle towards the center of the lane.

In an example embodiment, the one or more sensors comprise a radar-based sensor, wherein the sensor data comprises first sensor data received from the radar-based sensor, and wherein augmenting the set of vehicle safety response control commands comprises: determining, by the one or more processors and using the first sensor data, that an obstacle is present along a planned trajectory of the vehicle indicated by the future vehicle trajectory data; and modifying, by the one or more processors, one or more control commands of the set of vehicle safety response control commands to obtain one or more augmented vehicle safety response control commands of the set of augmented vehicle safety response control commands, wherein the one or more augmented vehicle safety response control commands, when implemented, cause the one or more actuators to adjust at least one of a steering control or a braking control for the vehicle to cause the vehicle to deviate from the planned trajectory in order to avoid the obstacle.

In an example embodiment, the method includes, prior to determining that the vehicle computing platform has failed: receiving, by the one or more processors, a set of vehicle control commands from the vehicle computing platform; and relaying, by the one or more processors, the set of vehicle control commands to the one or more actuators.

In an example embodiment, the one or more processors comprise a minimal risk condition control (MRCC) vehicle safety system.

In an example embodiment, the one or more actuators comprises a drive-by-wire (DBW) actuator.

In an example embodiment, the MRCC vehicle safety system and the DWB actuator constitute part of an integrated system, and wherein the MRCC vehicle safety system communicates with the DWB actuator using a proprietary vehicle communication protocol.

In an example embodiment, the vehicle computing platform is a primary computing platform of the vehicle.

In an example embodiment, a system for automated control of a vehicle is disclosed. The system includes at least one processor and at least one memory storing computer-executable instructions. The at least one processor is configured to access the at least one memory and execute the computer-executable instructions to perform a set of operations including The above-described system is further configured to perform any of the operations/functions and may include any of the additional features/aspects of example embodiments of the invention described above in relation to example computer-implemented methods of the invention.

In an example embodiment, the system includes a vehicle computing platform; one or more actuators; and at least one processor; and at least one memory storing computer-executable instructions, wherein the at least one processor is configured to access the at least one memory and execute the computer-executable instructions to: receive future vehicle trajectory data from the vehicle computing platform; determine that the vehicle computing platform has failed; determine a set of vehicle safety response control commands based at least in part on the future vehicle trajectory data; and send the set of vehicle safety response control commands to the one or more actuators to initiate an automated safety response measure for the vehicle in response to failure of the vehicle computing platform.

In an example embodiment, the future vehicle trajectory data is indicative of a planned trajectory of the vehicle for a period of time subsequent to a time of receipt of the future vehicle trajectory data.

In an example embodiment, the at least one processor is configured to determine that the vehicle computing platform has failed by executing the computer-executable instructions to perform one of: receive, from the vehicle computing platform, a failure signal indicating that the vehicle computing platform has failed, or determine that connectivity between the at least one processor and the vehicle computing platform has been lost for at least a threshold period of time.

In an example embodiment, the at least one processor is further configured to execute the computer-executable instructions to: receive sensor data from one or more sensors of the vehicle; augment the set of vehicle safety response control commands using the sensor data to obtain a set of augmented vehicle safety response control commands; and send the set of augmented vehicle safety response control commands to the vehicle actuation system to enhance the safety response measure for the vehicle.

In an example embodiment, the one or more sensors comprise an inertial sensor, wherein the sensor data comprises first sensor data received from the inertial sensor, and wherein the at least one processor is configured to augment the set of vehicle safety response control commands by executing the computer-executable instructions to: determine a current location of the vehicle using the first sensor data; determine, based at least in part on the future vehicle trajectory data, that the current location of the vehicle deviates from an expected location of the vehicle; and modify a vehicle steering control command of the set of vehicle safety response control commands to obtain an augmented vehicle steering control command of the set of augmented vehicle safety response control commands, wherein the augmented vehicle steering control command, when implemented, causes the vehicle actuation system to adjust a steering control for the vehicle to reduce the deviation between the current location of the vehicle and the expected location of the vehicle.

In an example embodiment, the one or more sensors comprise a radar-based sensor, wherein the sensor data comprises first sensor data received from the radar-based sensor, and wherein the at least one processor is configure to augment the set of vehicle safety response control commands by executing the computer-executable instructions to: determine, using the first sensor data, that an obstacle is present along a planned trajectory of the vehicle indicated by the future vehicle trajectory data; and modify one or more control commands of the set of vehicle safety response control commands to obtain one or more augmented vehicle safety response control commands of the set of augmented vehicle safety response control commands, wherein the one or more augmented vehicle safety response control commands, when implemented, cause the one or more actuators to adjust at least one of a steering control or a braking control for the vehicle to cause the vehicle to deviate from the planned trajectory in order to avoid the obstacle.

In an example embodiment, a computer program product for automated control of a vehicle is disclosed. The computer program product includes a non-transitory computer-readable medium storing computer/machine-executable instructions that responsive to execution by a processing circuit including one or more processing units cause a method to be performed. The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1A:
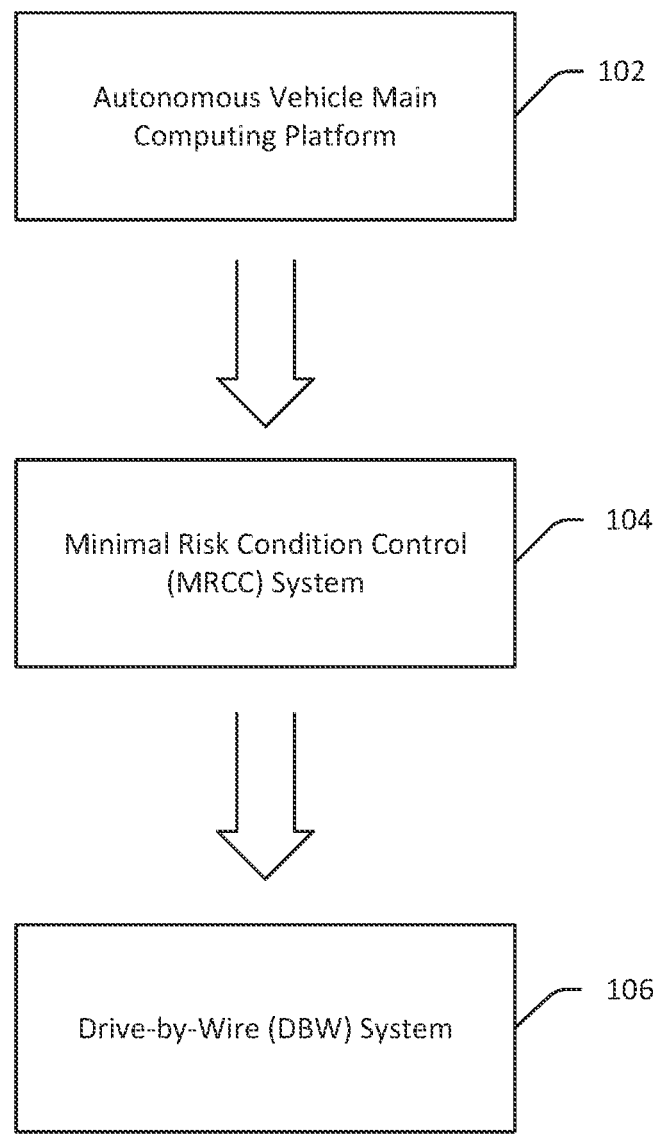
FIG. 1A is a schematic block diagram of a vehicle safety system within a serialized vehicle computing architecture in accordance with example embodiments of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Example embodiments of the invention relate to vehicle systems, methods, non-transitory computer-readable media, techniques, and methodologies for implementing automated vehicle safety response measures to ensure continued safe automated vehicle operation for a limited period of time after a vehicle component that supports an automated vehicle driving function fails. The vehicle may be, for example, an autonomous vehicle with at least partial automation of one or more driving functions. The autonomous vehicle may include a vehicle computing platform responsible for performing computationally intensive calculations in connection with tasks (e.g., object detection and perception) critical for safe autonomous vehicle operation. When a critical vehicle component/system such as a vehicle computing platform fails, the vehicle is likely no longer capable of performing of calculations required to safely operate and navigate the vehicle in an autonomous manner, or at a minimum, is no longer able to ensure the accuracy of such calculations. Automated vehicle safety response measures disclosed herein can—despite failure of the critical vehicle component/system—ensure continued safe automated vehicle operation for a limited period of time to bring the vehicle to a safe stop.

As used herein, an autonomous vehicle refers to any vehicle with at least partial automation of one or more driving functions. For example, an autonomous vehicle may include vehicles classified at a Society of Automotive Engineers (SAE) automation level between 2 and 5, inclusive. An autonomous vehicle may be capable of fully automated vehicle control without any human input needed, but may nonetheless have a safety driver present who is capable of taking over manual driving functions if the automated driving functions fail. In other example embodiments, an autonomous vehicle may be driverless, in which case, the automated safety response techniques described herein are critical to ensuring that the vehicle is able to safely come to a stop in the event of a significant vehicle component/system failure (e.g., a vehicle computing platform failure) because there is no human driver to assume manual control of the vehicle. Given their particular applicability to such vehicles, example embodiments of the invention may be described herein in connection with fully autonomous vehicles that do not require (and thus may not include) a human driver to provide manual driving input or take over manual control of the vehicle. It should be appreciated, however, that example embodiments of the invention are equally applicable to any type of vehicle having at least partial automation capabilities including vehicles that require a human driver to provide at least some manual driving input.

FIG. 1A depicts a vehicle safety system 104 within a serialized vehicle computing architecture in accordance with example embodiments of the invention. In example embodiments, the vehicle safety system 104 may be a minimal risk condition control (MRCC) system. The MRCC vehicle safety system 104 may be configured to initiate and implement vehicle safety measures that satisfy, for example, the National Highway Transportation and Safety Administration (NHTSA) definition for establishing a fall back (minimal risk condition) state for a vehicle when a vehicle component/system fails. In example embodiments, the failed vehicle system may be a vehicle computing platform 102, which may be a main (primary) computing platform of an autonomous vehicle, for example.

According to the NHTSA, a minimal risk condition (MRC) is defined as a low-risk operating condition that an automated driving system automatically resorts to either when a system fails or when a human driver fails to respond appropriately to a request to take over the dynamic driving task. Further NHTSA requirements relating to the MRC include that it should be administered in a manner that will facilitate safe operations of the vehicle and minimize erratic driving behavior and should include fall back actions that minimize the effects of errors in human driver recognition and decision making during and after transitions to manual control. In addition, in cases of higher vehicle automation where a human driver may not be present in the vehicle, the MRC must include the capability to bring the vehicle safely to a stop without the intervention of a human driver. The MRC may include different automated vehicle safety measures in response to different driving conditions/scenarios that may be present when system failure occurs. For instance, the automated vehicle safety measures that are taken to establish the MRC may depend on whether the vehicle is travelling straight or on a curve, whether the vehicle is making a turn, whether other vehicles are in proximity to the vehicle, and so forth.

In example embodiments, the MRCC vehicle safety system 104 depicted in FIG. 1A may be configured to initiate vehicle safety response measures in order to establish an MRC for a vehicle in response, for example, to detected failure of the vehicle computing platform 102. The serialized computing architecture depicted in FIG. 1A may facilitate the MRCC vehicle safety system's 104 ability to detect failure of the vehicle computing platform 102 and initiate the vehicle safety response measures. In example embodiments, the serial computing architecture may enable serialized communication between the main vehicle computing platform 102, the MRCC vehicle safety system 104, and a vehicle actuation system 106, whereby the main computing platform 102 generates and sends vehicle control commands, such as those relating to an acceleration pedal, a brake pedal, and/or a steering angle, to the MRCC vehicle safety system 104, which in turn, relays the control commands to the vehicle actuation system 106 for implementation.

As previously noted, in example embodiments, the vehicle computing platform 102 may be a main (primary) vehicle computing platform for the vehicle. Other example embodiments in which the main vehicle computing platform 102 may operate in tandem with a secondary vehicle computing platform will be described later in this disclosure. The vehicle computing platform 102 may include one or more processing units and memory that stores machine-readable/machine-executable instructions executable by the processing unit(s) to perform various calculations/processing required to support automated driving functions. Such calculations/processing may include, without limitation, processing to perform object detection/perception, which may require processing vast amounts of sensor data at low processing latency in order to ensure that the vehicle is able to make the kind of real-time automated vehicle navigation decisions that are required for safe autonomous vehicle operation. Such sensor data may include data received from various types of sensors including, without limitation, a light detection and ranging (LiDAR) sensor; a camera; a radar-based sensor; an inertial sensor such as an accelerometer, gyroscope, magnetometer, or the like; a temperature sensor; an infrared sensor; a near-infrared sensor; a far-infrared sensor; an ultrasonic sensor; and so forth. In example embodiments, a LiDAR may form part of a sensor assembly that also includes, for example, multiple cameras circumferentially positioned around the LiDAR. In some embodiments, an inertial measurement unit (IMU) may be provided that includes accelerometers and gyroscopes, and optionally, magnetometers.

In example embodiments, the main vehicle computing platform 102 may be, for example, an integrated circuit containing a high-performance microprocessor or microcontroller such as a graphical processing unit (GPU) capable of executing algorithms that require processing large blocks of data (e.g., sensor data) in parallel, for example. In some example embodiments, the main vehicle computing platform 102 may include multiple types of processing units (e.g., GPUs, central processing units (CPUs), application-specific integrated circuits (ASICs), field-programmable gate arrays (FPGAs), etc.) potentially distributed across multiple computing devices and in communication with one another via one or more communication buses.

In example embodiments, the MRCC vehicle safety system 104 may be a vehicle control unit (VCU) that meets stringent safety and reliability requirements such as those specified by the Automotive Safety Integrity Level (ASIL) risk classification scheme defined by International Organization for Standardization (ISO) 26262—a standard for establishing functional safety for road vehicles. In example embodiments, the MRCC vehicle safety system 104 may be a VCU rated at the ASIL-D level, which dictates the highest integrity and reliability requirements within the ASIL classification scheme. By providing an ASIL-D rated VCU as the MRCC vehicle safety system 104, for example, the integrity and reliability of the MRCC vehicle safety system 104 is greatly enhanced and the likelihood that the system 104 experiences failure is minimized. This, in turn, ensures that the MRCC vehicle safety system 104 will be able to take the vehicle safety response measures necessary to establish the MRC in the event of a vehicle component/system failure such as failure of the main vehicle computing platform 102. The MRCC vehicle safety system 104 may include components such as transistors (including Metal Oxide Silicon Field Effect Transistors (MOSFETs) and bipolar transistors), diodes, and/or integrated circuits. These components may be made from materials such as silicon or Gallium Nitride (GaN).

In example embodiments, the vehicle actuation system 106 may be a drive-by-wire (DBW) system. The DBW system 106 may include electrical and/or electromechanical systems/components that perform vehicle actuation controls such as steering, throttle, and braking controls that are traditionally achieved via mechanical linkages. The DBW system 106 may replace traditional mechanical control systems with electronic control systems that utilize electromechanical actuators and human-machine interfaces (HMIs) such as pedal and steering feel emulators. Components that are present in traditional mechanical vehicle actuation systems such as a steering column, intermediate shafts, pumps, hoses, belts, coolers, master cylinders, etc. may thus be absent from the DBW system 106. In example embodiments, the DBW system 106 may be configured to implement one or more of the following vehicle actuation controls: throttle-by-wire (where vehicle propulsion may be achieved by means of an electronic throttle without any cables from the accelerator pedal to the throttle valve of the engine); brake-by-wire (where caliper actuation may be achieved using motors thereby obviating the need for hydraulics); shift-by-wire (where a direction of motion of the vehicle (e.g., forward or reverse) may be set via electronic commands sent to actuators inside the transmission); steer-by-wire (where steering control (e.g., wheel direction) may be achieved through electric motors that are actuated by electronic control units); and park-by-wire (where electronic commands may be sent to a motor to actuate a parking pawl of a transmission).

In example embodiments, the main vehicle computing platform 102 may generate vehicle control commands based on the results of vehicle control algorithms executed by the platform 102. As previously noted, executing such algorithms may involve processing large amounts of data from multiple types of vehicle sensors. The main vehicle computing platform 102 may be configured to continuously generate and send vehicle control commands to the MRCC vehicle safety system 104, which in turn, may be configured to relay the vehicle control commands to the DBW system 106. The MRCC vehicle safety system 104 may be configured to communicate with a variety of different OEM DBW systems using standard communication protocols or communication protocols that are specific to each OEM DBW system.

The DBW system 106 may be configured to interpret and implement the vehicle control commands to initiate automated vehicle controls (e.g., steering controls, throttle controls, braking controls, etc.) associated with real-time autonomous vehicle operation. The MRCC vehicle safety system 104 may introduce minimal latency in relaying the vehicle control commands from the main vehicle computing platform 102 to the DBW system 106, thereby ensuring that the DBW system 106 is able to receive, interpret, and implement the vehicle control commands in real-time or near-real-time. In some embodiments, the main vehicle computing platform 102 may, at times, bypass the MRCC vehicle safety system 104 and send vehicle control commands directly to the DBW system 106.

Along with the vehicle control commands for controlling the real-time automated operation of the vehicle, the main vehicle computing platform 102 may also send future vehicle trajectory and motion information to the MRCC vehicle safety system 104. The future vehicle trajectory information may indicate a planned future trajectory for the vehicle for a limited period of time subsequent to receipt of the trajectory information. In example embodiments, the future vehicle trajectory data may indicate a planned trajectory for the vehicle for a period of about 5 seconds to about 10 seconds, for example, subsequent to receipt of the trajectory data. The future vehicle trajectory data may be generated by the main vehicle computing platform 102 based on a past trajectory of the vehicle; a current trajectory of the vehicle; and/or obstacles, road curvature, or the like that may impact the future trajectory of the vehicle. The motion information may indicate actual future motion of the vehicle following receipt of the trajectory information.

In the event of failure of the main vehicle computing platform 102, for example, the MRCC vehicle safety system 104 may utilize the latest future vehicle trajectory and motion data received from the main computing platform 102 just prior to its failure to determine a set of vehicle safety response control commands that, when implemented by the DBW system 106, cause the vehicle to decelerate and come to a safe stop along the planned vehicle trajectory. In some example embodiments, the MRCC vehicle safety system 104 may generate the vehicle safety response control commands based on processing of the future vehicle trajectory data that is performed at the MRCC system 104. In other example embodiments, the main vehicle computing platform 102 may send the vehicle safety response control commands to the MRCC vehicle safety system 104 along with the corresponding future vehicle trajectory data, in which case, the MRCC system 104 may relay the safety control commands to the DBW system 106 without performing any processing (or performing only minimal processing) on the future vehicle trajectory data. The manner in which failure of the vehicle computing platform 102 may be detected will be described in more detail later in this disclosure.

In some example embodiments, the main vehicle computing platform 102 may continuously stream the future vehicle trajectory data to the MRCC vehicle safety system 104. At any given point in time, the MRCC system 104 may be configured to store only a portion of the streamed future vehicle trajectory data corresponding to a predetermined period of time (e.g., 5-10 seconds). That is, during vehicle operation, the MRCC vehicle safety system 104 may continuously store newly received future vehicle trajectory data, and as a period of time during which prior received vehicle trajectory data is valid elapses without failure of the computing platform 102, may discard the prior received vehicle trajectory data because it longer represents the planned future trajectory of the vehicle.

Figure 1B:
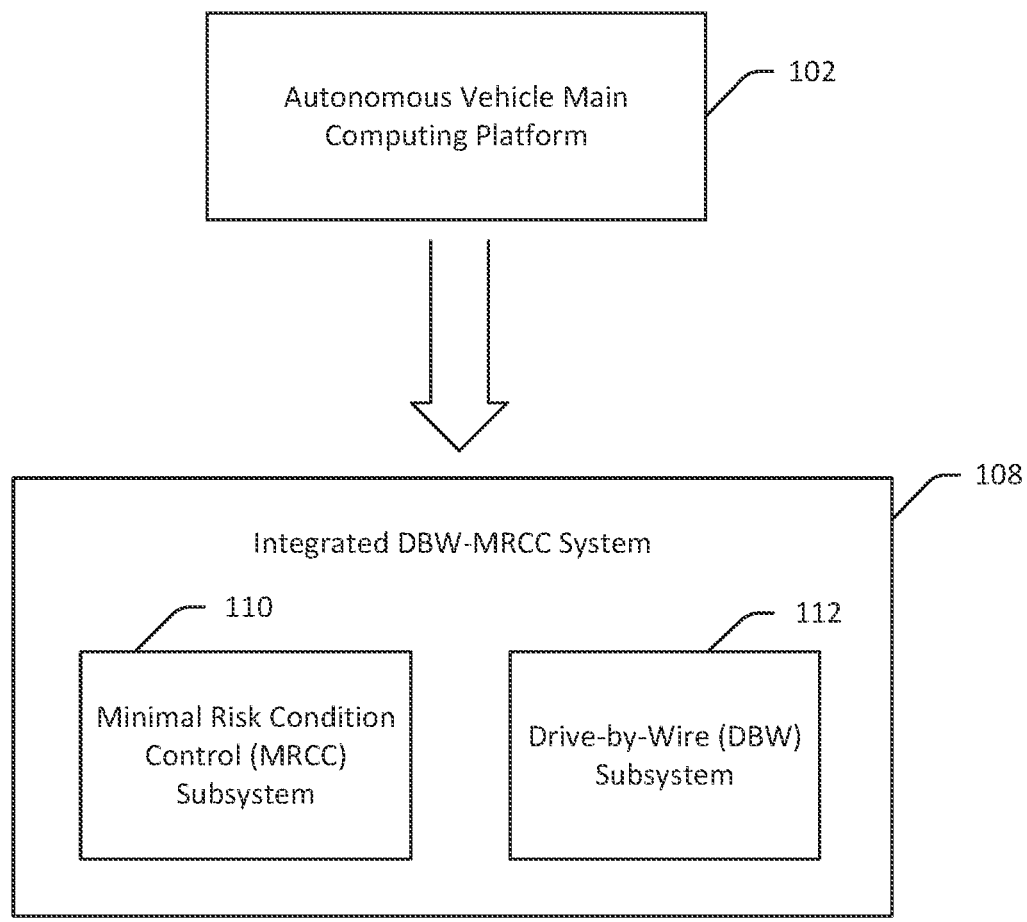
FIG. 1B is a schematic block diagram of an integrated vehicle safety system and vehicle actuation system within a serialized vehicle computing architecture in accordance with example embodiments of the invention.

FIG. 1B is a schematic block diagram of an alternative serialized vehicle computing architecture that includes an integrated vehicle safety system and vehicle actuation system. As shown in FIG. 1B, the main vehicle computing platform 102 may be in serial communication with an integrated DBW-MRCC system 108. The integrated DBW-MRCC system 108 may include an MRCC vehicle safety subsystem 110 and a DBW subsystem 112. In some example embodiments, the MRCC vehicle safety subsystem 110 may be implemented similarly to the MRCC vehicle safety system 104 (FIG. 1) as an ASIL-D VCU. Moreover, in some example embodiments, the DBW subsystem 112 may be a proprietary DBW system, and the MRCC vehicle safety subsystem 110 may be configured to communicate with the DBW system using a proprietary communication protocol.

Figure 1C:
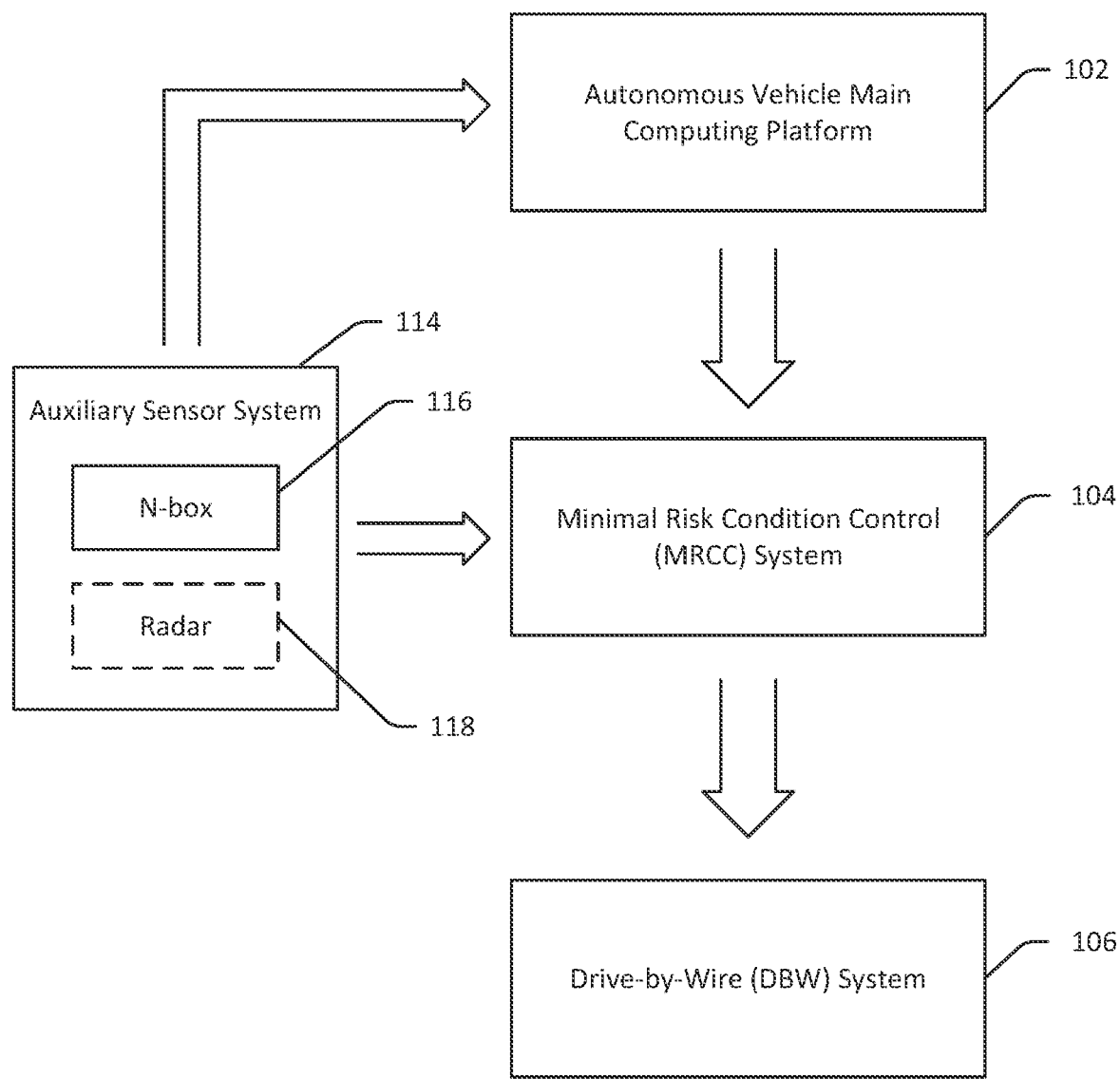
FIG. 1C is a schematic block diagram of a vehicle safety system augmented with sensor data from an auxiliary sensor system within a serialized vehicle computing architecture in accordance with example embodiments of the invention.

FIG. 1C is a schematic block diagram illustrating example embodiments in which output of the MRCC vehicle safety system 104 is augmented using sensor data from an auxiliary sensor system 114. As depicted in FIG. 1C, the auxiliary sensor system 114 may include an N-box 116 (which may be short for "Navigation-box"), and optionally, may include a radar-based sensor 118. Depending on the particular implementation, the auxiliary sensor system 114 may include one or more other types of vehicle sensors (e.g., a LiDAR, a camera, etc.). In some embodiments, the auxiliary sensor system 114 may also be communicatively coupled to the main vehicle computing platform 102 as processing performed by the main computing platform 102 may require sensor data from one or more of the sensors of the auxiliary sensor system 114. In some embodiments, the auxiliary sensor system 114 may not be a physically demarcated or delineated system of sensors within the vehicle. For instance, there may be no single housing that contains all sensors of the auxiliary sensor system 114. Rather, in some embodiments, the auxiliary sensor system 114 may simply represent a logical collection of existing vehicle sensors that, in addition to being communicatively coupled to the main vehicle computing platform 102, are also communicatively coupled to the MRCC vehicle safety system 104 to provide some subset of navigation-related sensor data to the MRCC system 104. In other example embodiments, the N-box 116 may include sensors that are redundant to other existing sensors in communication with the main vehicle computing platform 102.

The N-box 116 may include an IMU, and optionally, other types of sensors that provide the MRCC vehicle safety system 104 with data relating to vehicle parameters such as the vehicle's specific force, angular rate, orientation, or the like. In particular, an IMU of the N-box 116 may detect linear acceleration using one or more accelerometers and rotational rate using one or more gyroscopes. The MRCC vehicle safety system 104 may be configured to receive the raw IMU data from the N-box 116 and process the raw IMU data to calculate various vehicle navigation metrics including, without limitation, linear velocity and position relative to a global reference frame, angular rate, angular orientation, and so forth. The MRCC vehicle safety system 104 may be further configured to then use these calculated metrics to augment vehicle safety response control commands generated based on the future vehicle trajectory data.

For instance, the MRCC vehicle safety system 104 may utilize the navigation metrics calculated based on the raw IMU data to augment one or more vehicle safety response control commands generated based on the future vehicle trajectory data (e.g., a vehicle steering control command, a vehicle throttle control command, and/or a vehicle braking control command) to correct for any deviations in the vehicle's actual trajectory from an expected trajectory of the vehicle during the period of time over which the vehicle response safety measure is taken and the vehicle is brought to a halt. More specifically, during the period over which the vehicle safety response measure is taken to bring the vehicle to a safe stop, the MRCC vehicle safety system 104 may continuously receive sensor data from the N-box 116 (e.g., data from an IMU) as feedback data and may update/augment the vehicle safety response control commands sent to the DBW system 106 based on the feedback data in order to mitigate the effects of any deviation in the vehicle's actual trajectory from the planned trajectory. In this manner, the MRCC vehicle safety system 104 can utilize the sensor data from the N-box 116 to provide an extra layer of control to the safety response measure by ensuring that the vehicle more closely follows the planned future trajectory during the vehicle stopping operation.

Figure 1D:
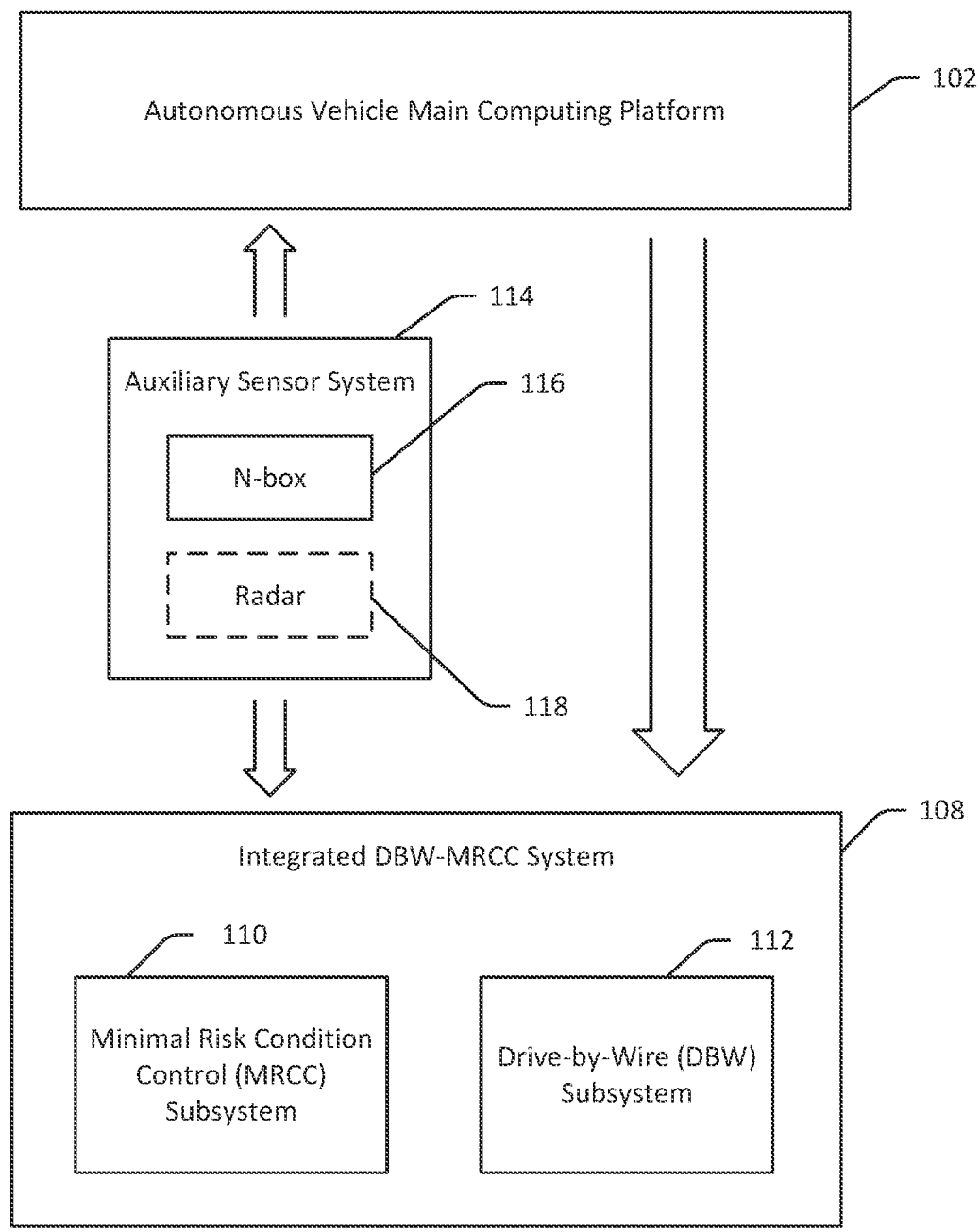
FIG. 1D is a schematic block diagram of an integrated augmented vehicle safety system and vehicle actuation system within a serialized vehicle computing architecture in accordance with example embodiments of the invention.

Referring now to FIG. 1D, an alternative serialized vehicle computing architecture that includes an integrated augmented vehicle safety system and vehicle actuation system is shown. The main vehicle computing platform 102 may be in serial communication with the integrated DBW-MRCC system 108, which may include the MRCC vehicle safety subsystem 110 and the DBW subsystem 112, similar to what is depicted in FIG. 1B. However, the MRCC vehicle safety subsystem 110 is now communicatively coupled to the auxiliary sensor system 114 and may receive sensor data from the system 114 (e.g., from the N-box 116 and optionally from a radar-based sensor 118) that can be used to augment the vehicle safety response control commands that it generates. As previously described, the MRCC vehicle safety subsystem 110 may be implemented as an ASIL-D VCU, the DBW subsystem 112 may be a proprietary DBW system, and the MRCC vehicle safety subsystem 110 may be configured to communicate with the DBW system using a proprietary communication protocol.

Figure 2A:
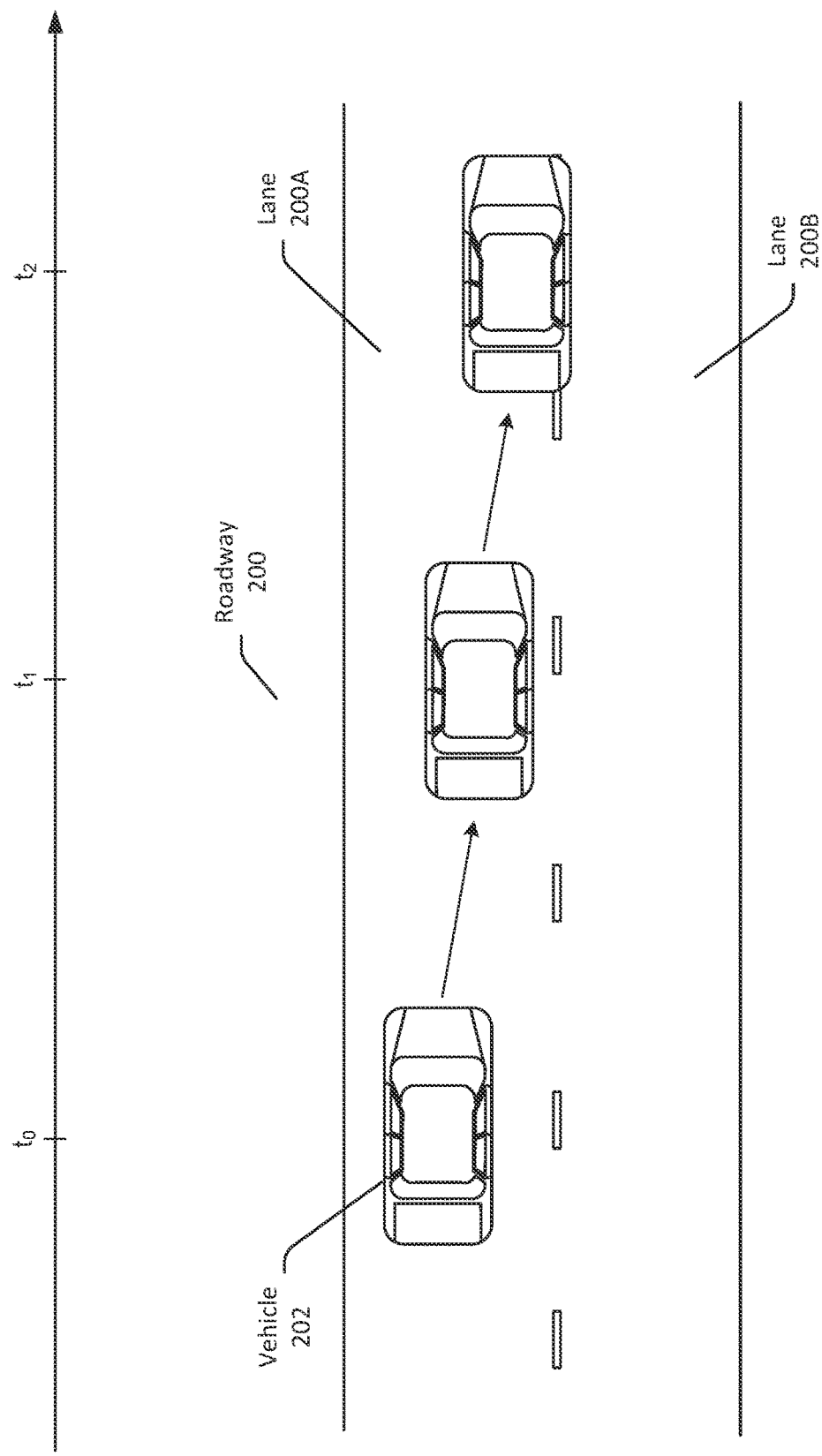
FIGS. 2A-2D depict various example automated vehicle safety response measures that can be taken by vehicle safety systems in accordance with example embodiments of the invention.
Figure 2B:
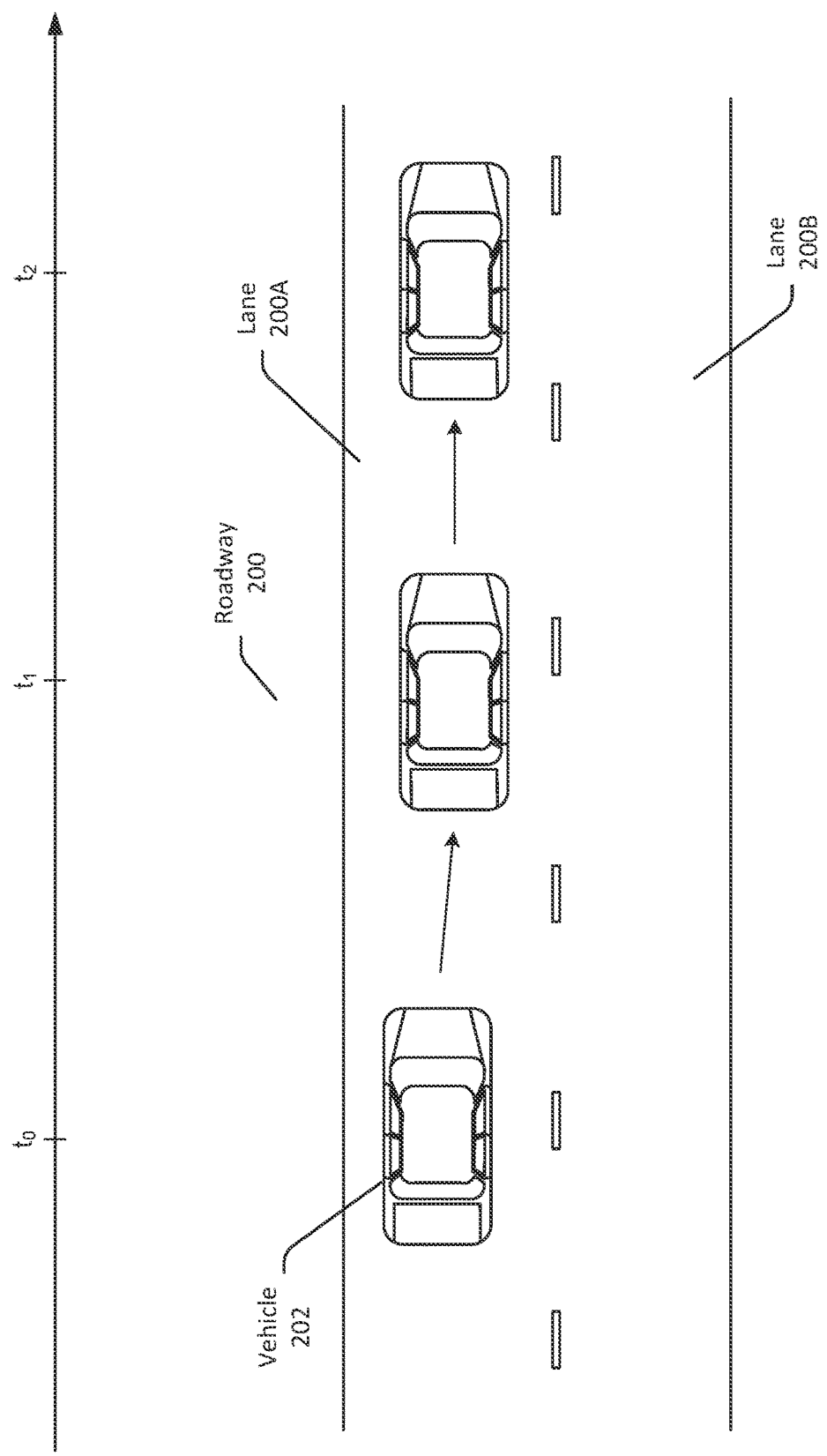

FIGS. 2A and 2B depict various example automated vehicle safety response measures that the aforementioned vehicle safety systems 104, 110 may initiate in response to vehicle system/component failure such as failure of the main vehicle computing platform 102. While the example scenarios of FIGS. 2A and 2B are described in reference to MRCC vehicle safety system 104, it should be appreciated that the scenarios are equally applicable to the MRCC vehicle safety subsystem 110 that forms part of an integrated DBW-MRCC system 108.

FIG. 2A depicts, for example, the implementation of a vehicle safety response measure by the DBW system 106 that is initiated based on vehicle safety response control commands received from the MRCC vehicle safety system 104 in the absence of any sensor data from the auxiliary sensor system 114. As shown in FIG. 2A, a vehicle 202 (e.g., an autonomous vehicle) may be traversing a road segment 200 that includes a lane 200A and a lane 200B. The vehicle 202 may begin to implement a vehicle response safety measure at time $t_0$. For example, the MRCC vehicle safety system 104 may detect—at some time prior to time $t_0$—failure of the main vehicle computing platform 102, and may utilize future vehicle trajectory data received from the main computing platform 102 just prior to its failure to determine corresponding vehicle safety response control commands. The MRCC vehicle safety system 104 may then send the vehicle safety response control commands to the DBW system 106, which may be configured to interpret and begin implementing the commands at time $t_0$ in order to bring the vehicle 202 to a stop within a time period over which the future vehicle trajectory data is valid. The latency between when failure of the main computing platform 102 is detected and when the DBW system 106 receives the vehicle safety response control commands may be minimal in order to ensure that the vehicle 202 is brought to a safe stop within a threshold period of time after failure of the main computing platform 102 is detected. The vehicle safety response control commands may include steering, throttle, and/or braking control commands that dictate, for example, the rate of automated deceleration and automated braking for the vehicle 202 to achieve a complete stop in accordance with a planned trajectory of the vehicle 202.

As shown in FIG. 2A, however, because the MRCC vehicle safety system 104 does not have the benefit of feedback sensor data from the auxiliary sensor system 114 in this example scenario, the MRCC vehicle safety system 104 may rely only on the future vehicle trajectory data to generate or otherwise determine the vehicle safety response control commands based on which the DBW system 106 implements the safety response measure and brings the vehicle 202 to a halt. As a result, during implementation of the safety response measure, the vehicle's 202 actual trajectory may deviate from the planned trajectory indicated by the future vehicle trajectory data. For example, at time $t_1$, the vehicle 202 may be at an intermediate position within the complete trajectory of the vehicle 202 as it completes the automated vehicle safety response measure. In particular, at time $t_1$, the vehicle's 202 actual location within the lane 200A may deviate from an expected location of the vehicle within the lane 200A based on the future vehicle trajectory data. For instance, the vehicle's 202 actual location within the lane 200A at time $t_1$ may be closer to the lane boundary with lane 200B than to a center of lane 200A. Moreover, when the vehicle 202 has completed the vehicle safety response measure and comes to a complete stop at time $t_2$, the vehicle's 202 actual position may deviate fairly significantly from its planned/expected position. For instance, at time $t_2$, the vehicle 202 may have crossed at least partially over a lane boundary between lane 200A and lane 200B.

In example embodiments, the vehicle's 200 actual trajectory during and after completion of the vehicle safety response measure may deviate from the planned trajectory corresponding to the future vehicle trajectory data for a variety of reasons. For instance, environmental factors such as external forces (e.g., wind speed, wind direction, frictional forces, etc.) on the vehicle 202 may change after the future vehicle trajectory data is generated, in which case, vehicle control commands determined based on the future vehicle trajectory data may not account for such changes, thereby causing the vehicle's 202 actual trajectory to deviate from its planned trajectory. As shown in FIG. 2B, however, providing a stream of sensor data from the auxiliary sensor system 114 to the MRCC vehicle safety system 104 enables the MRCC system 104 to periodically or continuously update/augment the vehicle safety response control commands in order to account and compensate for changes in the vehicle's operating environment that may otherwise cause it to deviate from the planned trajectory during implementation of the vehicle safety response measure. In particular, as shown in FIG. 2B, by augmenting the safety control commands using the sensor data from the auxiliary sensor system 114 as feedback data, the MRCC system 104 is able to mitigate the deviation between the vehicle's 202 actual trajectory during the vehicle safety response measure (e.g., as defined, at least in part, by the vehicle's 202 actual intermediate position within the lane 200A at time $t_1$ and its final position at time $t_2$) and its expected trajectory (e.g., along a center of the lane 200A). Augmenting the safety control commands using the sensor data from the auxiliary sensor system 114 as feedback data may be particularly beneficial in ensuring that the vehicle 202 comes to an automated stop within a current lane if, for example, the vehicle's 202 planned future trajectory at the time of failure of the vehicle computing platform 102 includes significant road curvature.

Figure 2C:
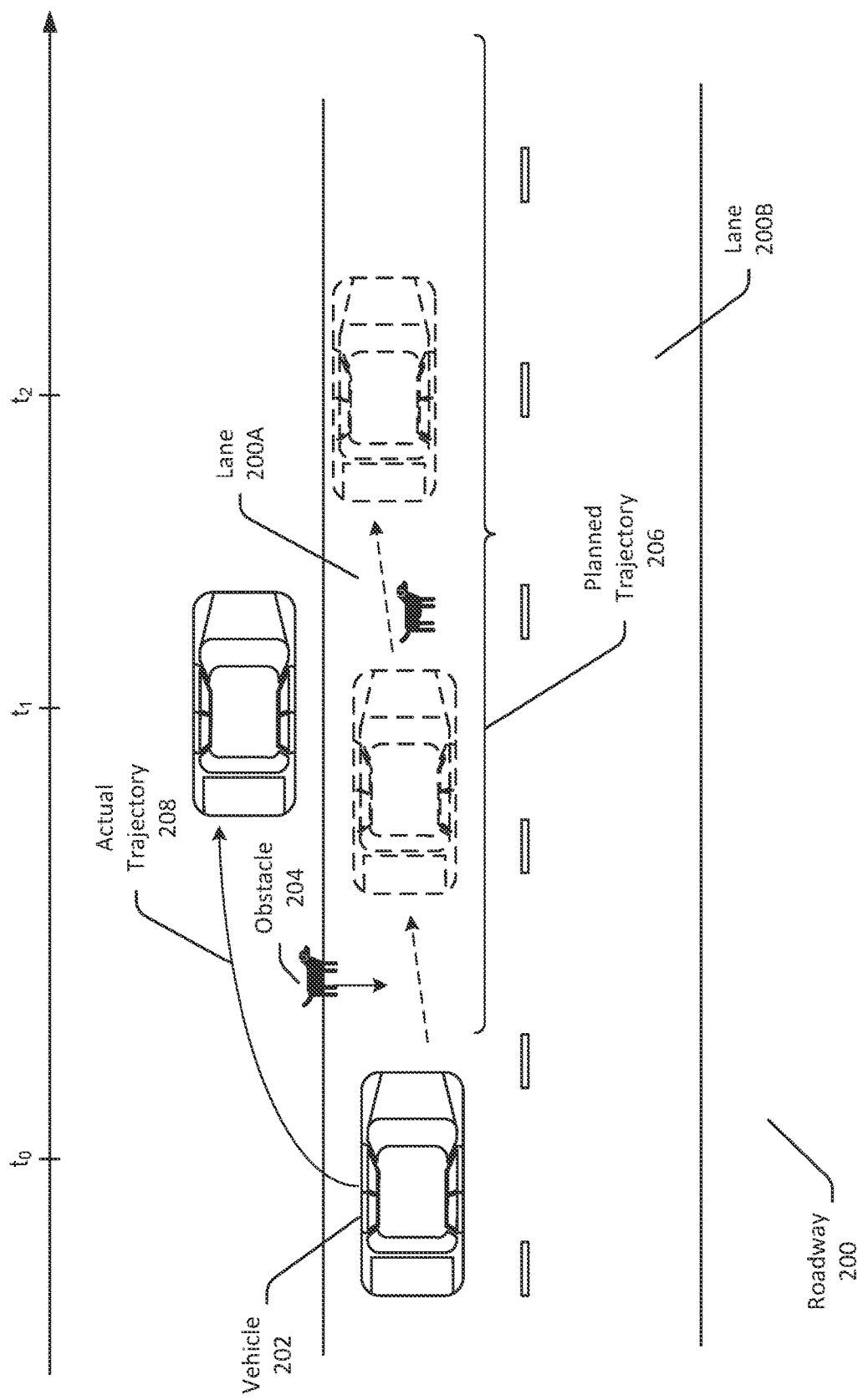

Referring now to FIG. 2C, another example vehicle safety response scenario is depicted in which radar data is used to augment vehicle safety response control commands for implementing a vehicle safety measure in response to failure of the vehicle computing unit 102, for example. As previously alluded to, the auxiliary sensor system 114 may include additional sensor(s) beyond the sensor(s) of the N-box 116. For example, the auxiliary sensor system 114 may further include one or more radar-based sensors 118. The radar sensor(s) 118 may supply the MRCC vehicle safety system 104 (or the MRCC vehicle safety subsystem 110 depending on the computing architecture that is employed) with radar data that can be processed by the MRCC system 104 to, for example, detect an obstacle 204 present in the path of a planned vehicle trajectory 206 corresponding to the future vehicle trajectory data. In particular, responsive to detecting the obstacle 204 based on the radar data, the MRCC vehicle safety system 104 may modify/augment/update the vehicle safety response control commands generated based on the future vehicle trajectory data to either cause the vehicle 202 to perform a hard braking operation or otherwise decelerate at a faster rate to bring the vehicle 202 to stop before encountering the obstacle 204 or to follow a modified trajectory 208 that deviates from the planned trajectory 204 and causes the vehicle 202 to avoid the obstacle 204. If the MRCC vehicle safety system 104 generates modified/augmented vehicle safety response control commands based on the radar data to cause the vehicle 202 to travel along the modified trajectory 208, the MRCC vehicle safety system 104 may also utilize the radar data to determine that the modified trajectory 208 provides a reasonably safe travel path for the vehicle 202 and that no obstacles are present along the modified trajectory 208.

Figure 1E:
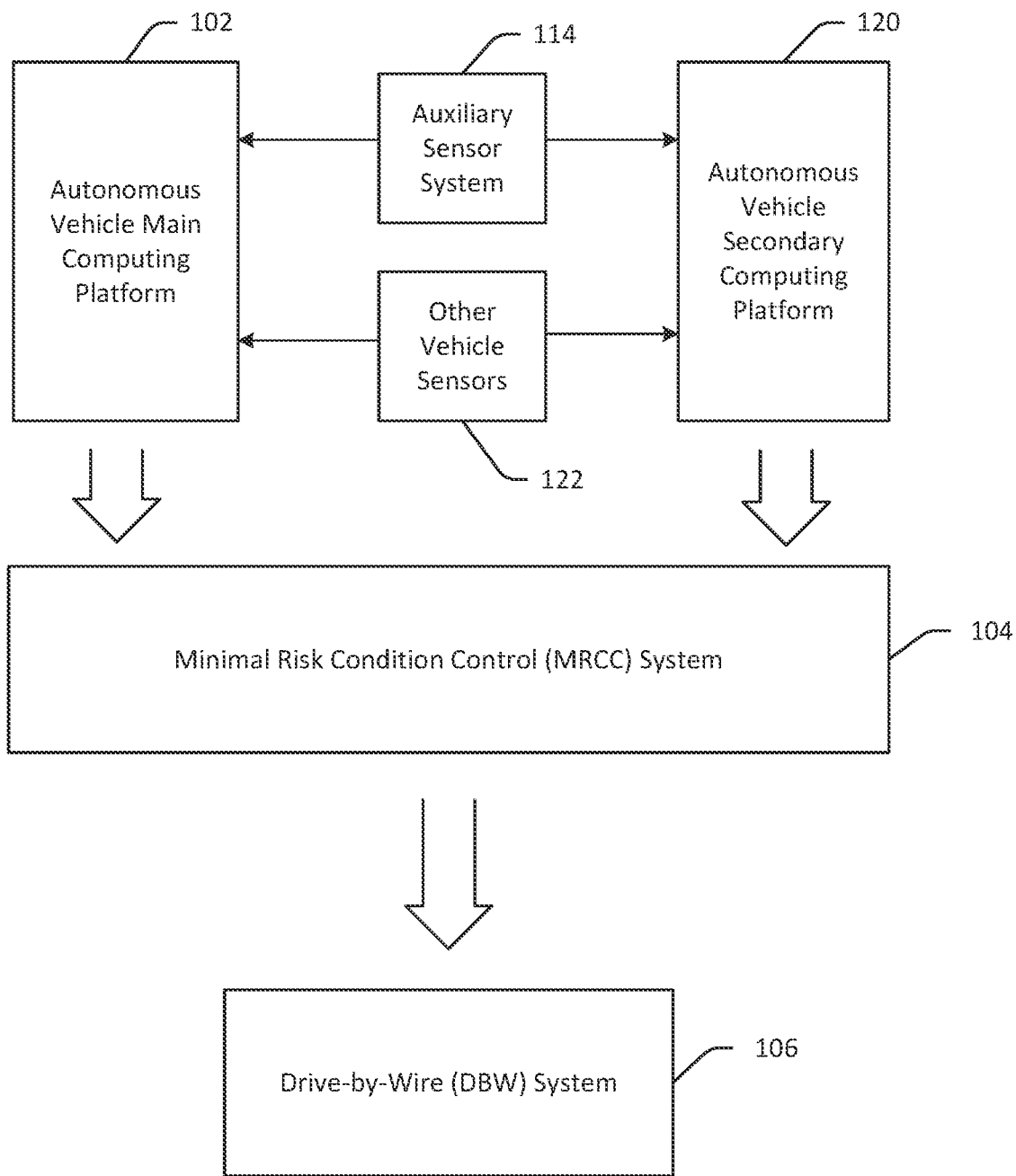
FIG. 1E is a schematic block diagram of a vehicle safety system within a serial-parallel vehicle computing architecture that includes a primary vehicle computing platform and a secondary vehicle computing platform in accordance with example embodiments of the invention.

Referring now to FIG. 1E, an alternative embodiment of a vehicle safety system is depicted according to which the vehicle safety system resides within a serial-parallel vehicle computing architecture that includes a primary vehicle computing platform (e.g., the main computing platform 102) and a secondary vehicle computing platform 120. In example embodiments, the main vehicle computing platform 102 and the secondary vehicle computing platform 120 may each occupy a same (parallel) level in the serialized architecture. Further, in example embodiments, in addition to the primary vehicle computing platform 102, the secondary vehicle computing platform 120 may also be configured to generate vehicle control commands and send the commands to the MRCC vehicle safety system 104, which in turn, may relay the control commands to the DBW system 106. In some example embodiments, the secondary vehicle computing platform 120 may perform calculations/processing to generate vehicle control commands that at least partially enable automated driving functions. By virtue of its greater processing capacity/lower processing latency, however, the main vehicle computing platform 102 may perform a greater number and/or more computationally intensive calculations/processing than the secondary vehicle computing platform 120.

In some embodiments, at least some of the processing performed by the secondary computing platform 120 may be redundant processing that is also performed by the main vehicle computing platform 102. In other example embodiments, some portion of the processing typically performed by the main vehicle computing platform 102 may be offloaded to the secondary computing platform 102. Processing may be offloaded from the main computing platform 102 to the secondary computing platform 120 to reduce processing latency and/or increase available processing resources of the main computing platform 102. For instance, if performance of the main computing platform 102 becomes degraded, but the main computing platform 102 is still operational and has not failed, then at least some of the processing that would typically be performed by the main computing platform 102 may be offloaded to the secondary computing platform 120.

Figure 2D:
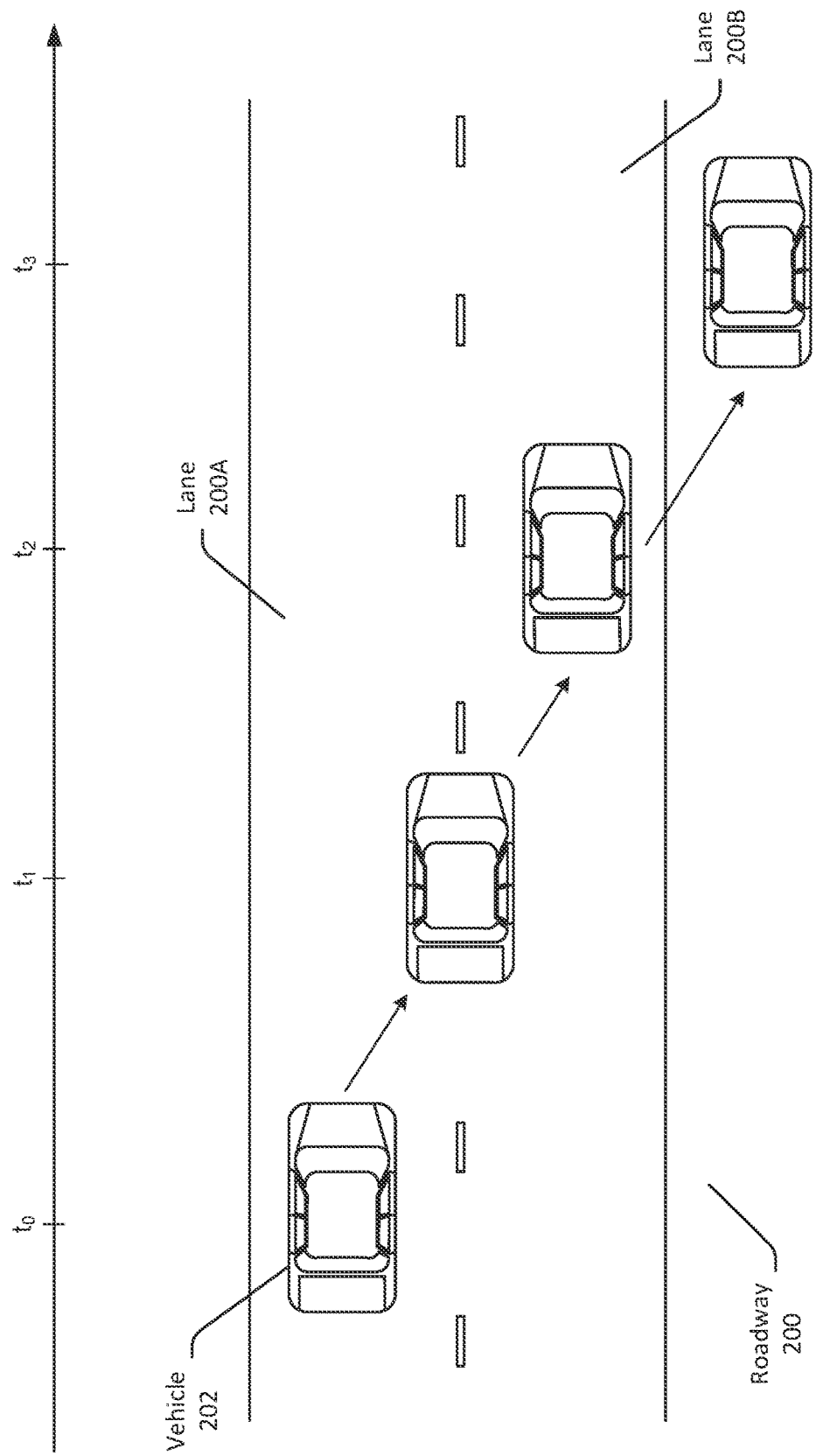

In some example embodiments, the secondary vehicle computing platform 120 may be configured to perform processing in connection with initiating vehicle safety response measures in the event of a failure of the main computing platform 102. The secondary vehicle computing platform 120 may be configured to handle a greater processing load and/or more computationally intensive tasks than the MRCC vehicle safety system 104. As such, in example embodiments, the secondary vehicle computing platform 120 may be configured to generate one or more vehicle safety response control commands corresponding to higher level (e.g., more complex) vehicle safety response measures in response to failure of the main computing platform 102. Such higher level vehicle safety response measures may include complex vehicle control commands—potentially augmented by sensor data from the auxiliary sensor system 114 and/or from one or more other vehicle sensors 122—that, when implemented by the DBW system 106, cause the vehicle 202 to execute at least one lane change maneuver (e.g., lane change from lane 200A to lane 200B) to bring the vehicle 202 to a stop in a slow lane or a shoulder of a roadway, as shown in FIG. 2D, for example. In particular, the secondary computing platform 120 may utilize IMU data from an IMU of the N-box 116, data from the radar 118, point cloud data from a LiDAR 122, or the like to ensure that a safe trajectory free of obstacles exists for the vehicle 202 to transition from its position at initiation of the vehicle safety response measure at time $t_0$ to its position at completion of the response measure at time $t_3$ with the vehicle 202 stopped in a rightmost area of the roadway 200.

In some embodiments, the main computing platform 102 and the secondary computing platform 120 may both simultaneously fail, in which case, the MRCC vehicle safety system 104 may be configured to generate lower level vehicle commands to, for example, bring the vehicle 202 to a stop along a planned trajectory indicated by the future vehicle trajectory data received from the main computing platform 102 and/or the secondary computing platform 120 prior to failure. The MRCC vehicle safety system 104 may also be configured to initiate a vehicle safety response measure and generate lower level vehicle safety response control commands based on the future vehicle trajectory it has received if, for example, it detects an inconsistency between control commands received from the main computing platform 102 and control commands received from the secondary computing platform 120.

In some embodiments, the MRCC vehicle safety system 104 may determine that the main computing platform 102 output and the secondary computing platform 120 output are inconsistent if, for example, the control commands received from the main computing platform 102 conflict with the control commands received from the secondary computing platform 120; if the results of sensor data processed by the main computing platform 102 conflict with the results of sensor data processed by the secondary computing platform 120 (e.g., the main computing platform 102 has detected an obstacle but the secondary computing platform 120 has not or vice versa); or the like. Inconsistency between output from the main computing platform 102 and output from the secondary computing platform 120 may indicate a failure of the main computing platform 102 and/or a failure of the secondary computing platform 120. Accordingly, the MRCC vehicle safety system 104 may initiate a vehicle safety response measure to bring the vehicle 202 to a stop in order to, for example, perform diagnostics on the main computing platform 102 and/or the secondary computing platform 120 to attempt to ascertain which platform may have failed and the nature of the cause of the failure.

Figure 1F:
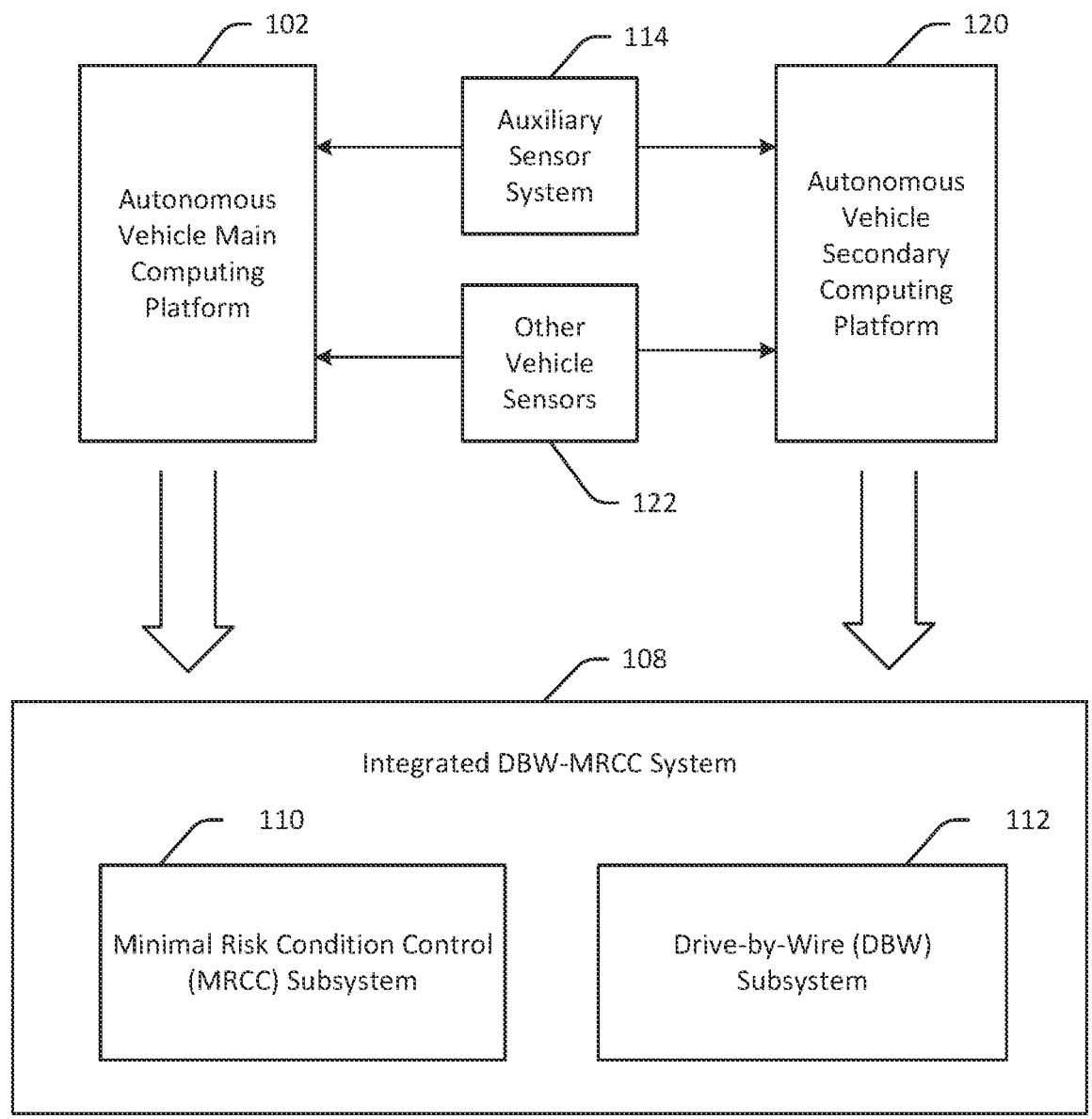
FIG. 1F is a schematic block diagram of an integrated vehicle safety system and vehicle actuation system within a serial-parallel vehicle computing architecture in accordance with example embodiments of the invention.

Referring now to FIG. 1F, an alternative serial-parallel vehicle computing architecture that includes the integrated DBW-MRCC system 108 in serial communication with both the main vehicle computing platform 102 and a secondary computing platform 120 is shown. As previously noted, the integrated DBW-MRCC system 108 includes both the MRCC vehicle safety subsystem 110 and the DBW subsystem 112. Further, as previously described, the MRCC vehicle safety subsystem 110 may be implemented as an ASIL-D VCU, the DBW subsystem 112 may be a proprietary DBW system, and the MRCC vehicle safety subsystem 110 may be configured to communicate with the DBW system using a proprietary communication protocol.

Figure 3A:
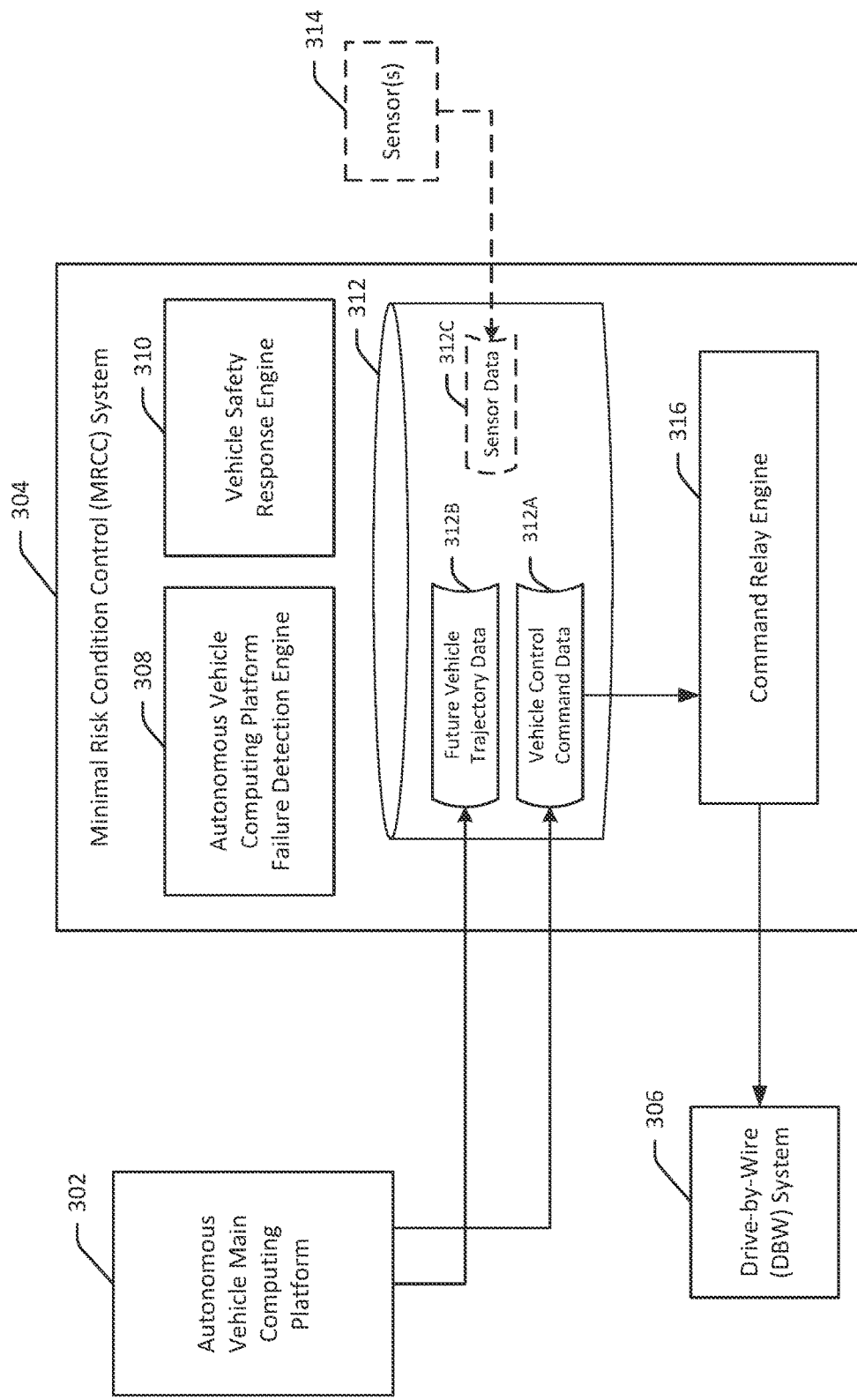
FIG. 3A is a hybrid data flow and block diagram illustrating serialized data flow between a vehicle computing platform, a vehicle safety system, and a vehicle actuation system in accordance with example embodiments of the invention.
Figure 3B:
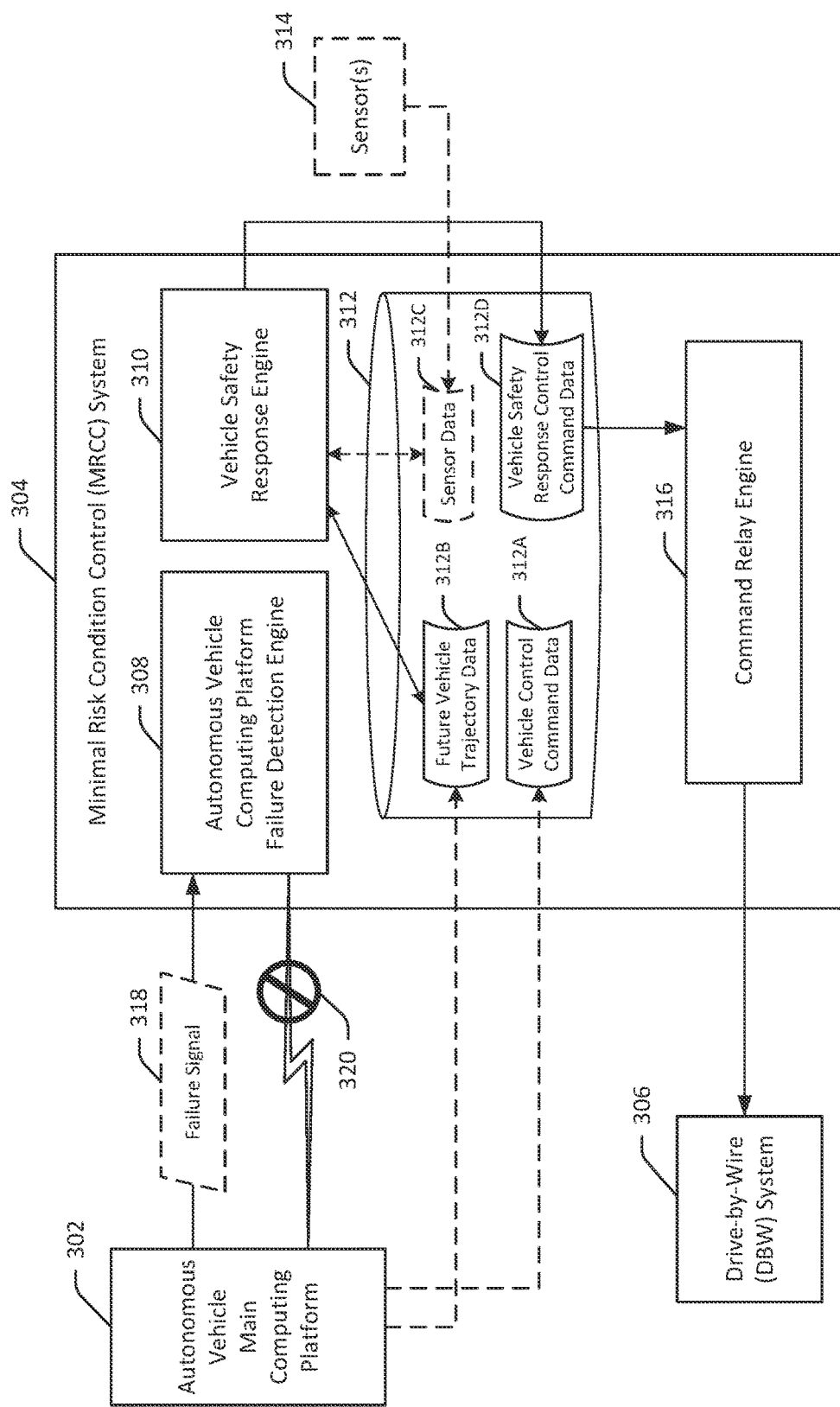
FIG. 3B is a hybrid data flow and block diagram illustrating the initiation of vehicle safety measures by a vehicle safety system in response to failure of a vehicle computing platform in accordance with example embodiments of the invention.
Figure 4:
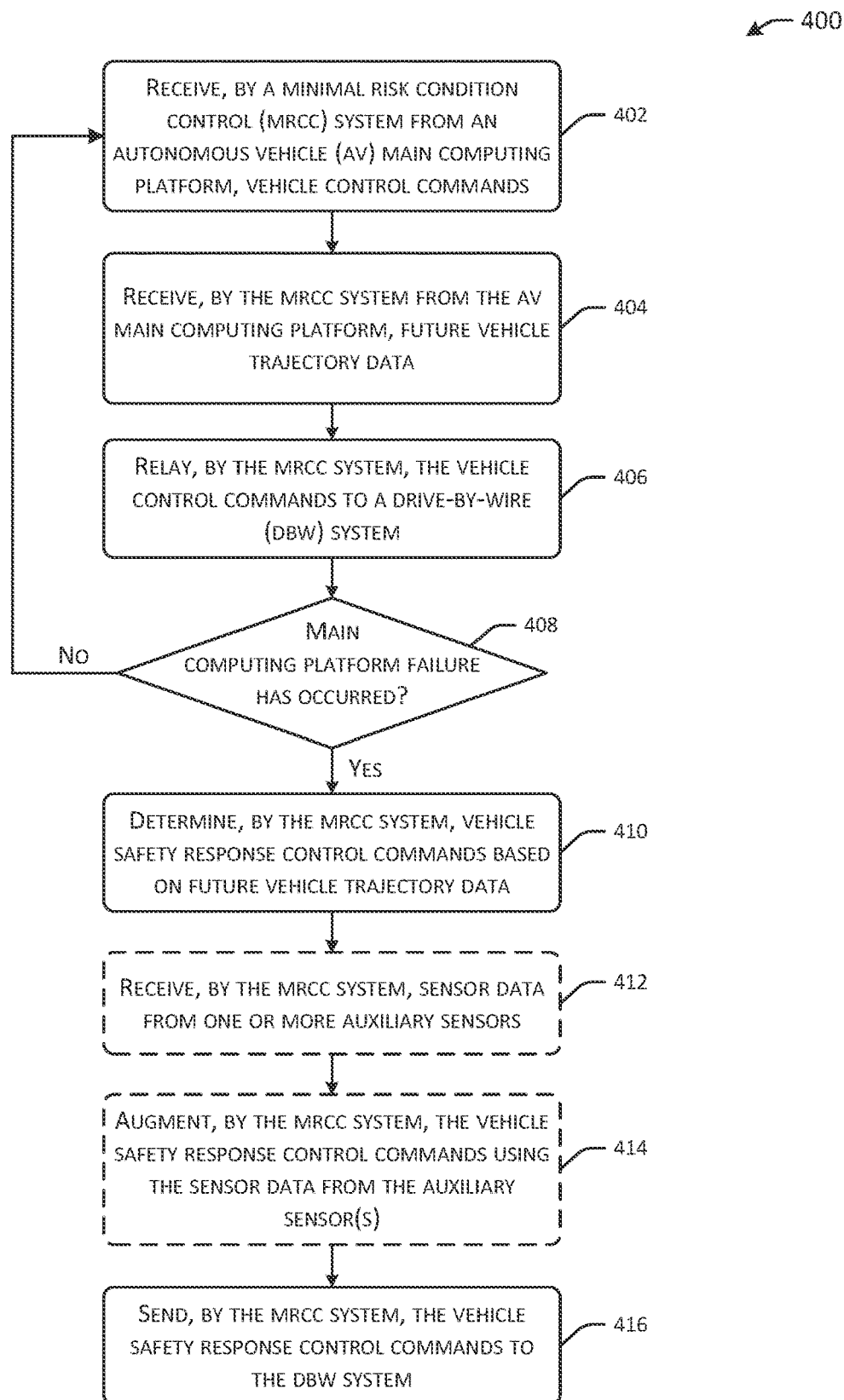
FIG. 4 is a process flow diagram of an illustrative method for detecting failure of a vehicle computing platform and initiating vehicle safety response measures by a vehicle safety system within a serialized vehicle computing architecture in accordance with example embodiments of the invention.

FIG. 3A is a hybrid data flow and block diagram illustrating serialized data flow between a vehicle computing platform, a vehicle safety system, and a vehicle actuation system in accordance with example embodiments of the invention. FIG. 3B is a hybrid data flow and block diagram illustrating the initiation of vehicle safety measures by a vehicle safety system in response to failure of a vehicle computing platform in accordance with example embodiments of the invention. FIG. 4 is a process flow diagram of an illustrative method 400 for detecting failure of a vehicle computing platform and initiating vehicle safety response measures by a vehicle safety system within a serialized vehicle computing architecture in accordance with example embodiments of the invention. FIG. 4 will be described in conjunction with FIGS. 3A and 3B hereinafter.

Each operation of any of the methods 400, 500, or 700 described herein can be performed by one or more of the engines/program modules depicted in FIG. 3A, 3B, or 8, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 3A, a main vehicle computing platform 302 is depicted. The vehicle computing platform 302 may represent an example implementation of the main vehicle computing platform 102, for example. Also depicted in FIG. 3A is an MRCC vehicle safety system 304 and a DBW system 306, which may represent example implementations of the MRCC vehicle safety system 104 and the DBW system 106, respectively. Alternatively, the MRCC vehicle safety system 304 and the DBW system 106 may be an example implementation of the integrated DBW-MRCC system 108, in which case, the MRCC vehicle safety system 304 may be an example implementation of the MRCC vehicle safety subsystem 110 and the DWB system 106 may be an example implementation of the DWB subsystem 112.

In example embodiments, the MRCC vehicle safety system 304 may include various computing engines configured to provide respective functionality of the system 304 including, for example, a vehicle computing platform failure detection engine 308, a vehicle safety response engine 310, and a command relay engine 316. The vehicle computing platform failure detection engine 308 may include computer-readable/computer-executable instructions that, when executed by one or more processing circuits of the MRCC system 304, cause operations to be performed to detect potential failure of the vehicle computing system 302. Vehicle computing platform failure detection by the failure detection engine 308 may cause computer-readable/computer-executable instructions of the vehicle safety response engine 310 to be executed by processing circuit(s) of the MRCC system 304 to cause operations to be performed to initiate a vehicle safety response measure including determining vehicle safety response control commands for the DBW system 306 to bring the vehicle to a safe stop. The command relay engine 316 may include computer-readable/computer-executable instructions that, when executed by processing circuit(s) of the MRCC system 304, cause operations to be performed to relay vehicle control commands from the main computing platform 302 to the DBW system 306 and to send vehicle safety response control commands to the DBW system 306.

Referring now to FIG. 4 in conjunction with FIG. 3A, at block 402 of the method 400, the MRCC vehicle safety system 304 may receive vehicle control command data 312A from the main vehicle computing platform 302. The vehicle control command data 312A may be indicative of vehicle control commands generated by the main computing platform 302 based on the results of vehicle control algorithms executed by the platform 302. As previously noted, executing such algorithms may involve processing large amounts of data from multiple types of vehicle sensors. The MRCC system 304 may store the received vehicle control command data 312B in one or more datastores 312. The datastore(s) 312 may include any suitable type of storage media/device.

The main vehicle computing platform 302 may be configured to continuously generate and send vehicle control commands to the MRCC vehicle safety system 304, and the command relay engine 316 may be executed to relay the vehicle control commands to the DBW system 306 at block 406 of the method 400. The DBW system 306 may be configured to interpret and implement the vehicle control commands to initiate automated vehicle controls (e.g., steering controls, throttle controls, braking controls, etc.) associated with real-time autonomous vehicle operation.

Along with the vehicle control command data 312A for controlling the real-time automated operation of the vehicle, the main vehicle computing platform 302 may also send future vehicle trajectory data 312B to the MRCC vehicle safety system 304 at block 404 of the method 400. The MRCC system 304 may store the future vehicle trajectory data 312B in the datastore(s) 312. The future vehicle trajectory data 312B may indicate a planned future trajectory for the vehicle for a limited period of time subsequent to receipt of the trajectory data 312B. For instance, in example embodiments, the future vehicle trajectory data may indicate a planned trajectory for the vehicle for a period of about 5 seconds to about 10 seconds subsequent to receipt of the trajectory data 312B. The future vehicle trajectory data 312B may be generated by the main vehicle computing platform 302 based on a past trajectory of the vehicle; a current trajectory of the vehicle; and/or obstacles, road curvature, or the like that may impact the future trajectory of the vehicle.

At block 408 of the method 400, computer-executable instructions of the failure detection engine 308 may be executed to determine whether the main computing platform 302 has failed. Referring now to FIG. 4 in conjunction with FIG. 3B, in some example embodiments, the failure detection engine 308 may detect failure of the vehicle computing platform 302 based on a failure signal 318 received by the MRCC vehicle safety system 304 from the vehicle computing platform 302. That is, in some embodiments, the main vehicle computing platform 302 may be configured to self-determine whether it has entered a failure condition or mode, and if so, generate the failure signal 318 and send the failure signal 318 to the MRCC vehicle safety system 304. The failure signal 318 may include a flag, a code, or other identifier that indicates to the failure detection engine 308 that the main vehicle computing platform 302 has failed.

In other example embodiments, the failure detection engine 308 may detect failure of the main vehicle computing platform 302 based on a loss in connectivity between the computing platform 302 and the MRCC system 304. In some embodiments, the failure detection engine 308 may need to detect a continuous loss in connectivity between the vehicle computing platform 302 and the MRCC vehicle safety system 304 for at least a threshold period of time before determining that the vehicle computing platform 302 has failed in order to avoid interpreting temporary losses in connectivity as failure. In some embodiments, if cumulative periods of lack of connectivity between the vehicle computing platform 302 and the MRCC system 304 exceed a threshold value over some predefined period of time, the failure detection engine 308 may determine that the vehicle computing platform 302 has effectively failed even if such losses in connectivity are non-contiguous.

In still other example embodiments, the failure detection engine 308 may be configured to monitor an operational status of the main vehicle computing platform 302 and assess potential failure of the vehicle computing platform 302 based on the monitored operational status. For instance, the failure detection engine 308 may monitor various operational metrics for the main computing platform 302 that are indicative of an operational health of the computing platform 302 such as processing latency, clock frequency, available processing resources, current processing load, internal operating temperature, working voltage, or the like. If one or more of these operational metrics (or some threshold number of metrics) have corresponding values that do not satisfy threshold values (e.g., exceed maximum threshold values or fall below minimum threshold values) or that fall outside of acceptable operating ranges for, optionally, at least threshold period(s) of time, then the MRCC vehicle safety system 304 may determine that the main computing platform 302 has failed.

In response to a negative determination at block 408 indicating that the main vehicle computing platform 302 has not failed, the method 400 may return to block 402, where vehicle control commands may continue to be sent by the vehicle computing platform 302 to the MRCC vehicle safety system 304 for relay to the DBW system 306. On the other hand, in the event of failure of the main vehicle computing platform 102 (a positive determination at block 408), the MRCC vehicle safety system 304 may, at block 410 of the method, utilize the latest future vehicle trajectory data 312B received from the main computing platform 302 just prior to its failure to determine a set of vehicle safety response control commands that, when implemented by the DBW system 306, cause the vehicle to decelerate and come to a safe stop along the planned vehicle trajectory.

The vehicle safety response control commands may be stored as data 312D in the datastore(s) 312. In some example embodiments, at block 410 of the method 400, the MRCC vehicle safety system 304 may generate the vehicle safety response control command data 312D based on processing of the future vehicle trajectory data 312B that is performed at the MRCC system 304. In other example embodiments, the main vehicle computing platform 302 may send the vehicle safety response control command data 312D to the MRCC vehicle safety system 304 along with the corresponding future vehicle trajectory data 312B, in which case, the MRCC system 304 may relay the safety control commands to the DBW system 306 without performing any processing (or performing only minimal processing) on the future vehicle trajectory data 312B.

In some example embodiments, the MRCC system 304 may receive sensor data 312C from one or more sensors 314 at block 412 of the method 400, and may store the sensor data 312C in the datastore(s) 312. The MRCC vehicle safety system 304 may then use the sensor data 312C to augment the vehicle safety response control commands at block 414 of the method 400. Augmenting the vehicle safety response with the sensor data 312C may help to ensure that the vehicle maintains the desired trajectory during the automated stopping maneuver implemented by the DBW system 306 in response to receipt of the vehicle safety response control commands from the MRCC vehicle system 304. The sensors 314 may include the auxiliary sensor system 114. As such, as described earlier with respect to the MRCC system 104 and the MRCC subsystem 110, the MRCC system 304 may augment the vehicle safety response control command data 312D using, for example, sensor data 312C received from the auxiliary sensor system 114. As previously noted, the auxiliary sensor system 114 may include the N-box 116, and optionally, may include the radar-based sensor 118.

In example embodiments, the sensor data 312C may include IMU data. In particular, the MRCC system 304 may receive raw IMU data, for example, from the N-box 116 at block 412, and may process the raw IMU data to calculate various vehicle navigation metrics including, without limitation, linear velocity and position relative to a global reference frame, angular rate, angular orientation, and so forth. The MRCC vehicle safety system 304 may be further configured to then use these calculated metrics to augment vehicle safety response control commands at block 414 that were generated based on the future vehicle trajectory data. For instance, the MRCC vehicle safety system 304 may utilize the navigation metrics calculated based on the raw IMU data to augment one or more vehicle safety response control commands generated based on the future vehicle trajectory data (e.g., a vehicle steering control command, a vehicle throttle control command, and/or a vehicle braking control command) to correct for any deviations in the vehicle's actual trajectory from an expected trajectory of the vehicle during the period of time over which a vehicle response safety measure is taken and the vehicle is brought to a halt.

Additionally, or alternatively, the sensor data 312C may include radar data that the MRCC system 304 receives from the radar-based sensor 118 at block 412. The MRCC system 304 may perform processing on the radar data to detect obstacles that may be present along the planned future vehicle trajectory. If the MRCC system 304 detects an obstacle based on the radar data, it may augment the vehicle safety response control command data 312D to generate an augmented safety response control command that increases a braking force applied to the vehicle in order to bring the vehicle to a stop at an earlier point in the planned trajectory and avoid colliding with the obstacle. Alternatively, the MRCC system 304 may generate augmented safety response control commands based on the radar data to cause the vehicle to follow a modified trajectory that deviates from the planned trajectory and avoids the obstacle. It should be appreciated that the MRCC system 304 may augment the vehicle safety response control command data 312D based on sensor data received from one or more other types of sensors 314 as well including, without limitation, a LiDAR, a camera, or the like.

Finally, at block 416 of the method 400, the MRCC system 304 may send the vehicle safety response control command data 314D to the DBW system 306, which in turn, may be configured to interpret and implement vehicle control commands specified in the data 314D to bring the vehicle to an automated safe stop along a specified trajectory. The specified trajectory may be a planned trajectory indicated by the future vehicle trajectory data 312B or a modified trajectory corresponding to vehicle safety response control commands augmented, for example, based on radar data from a radar-based sensor 314.

Figure 5:
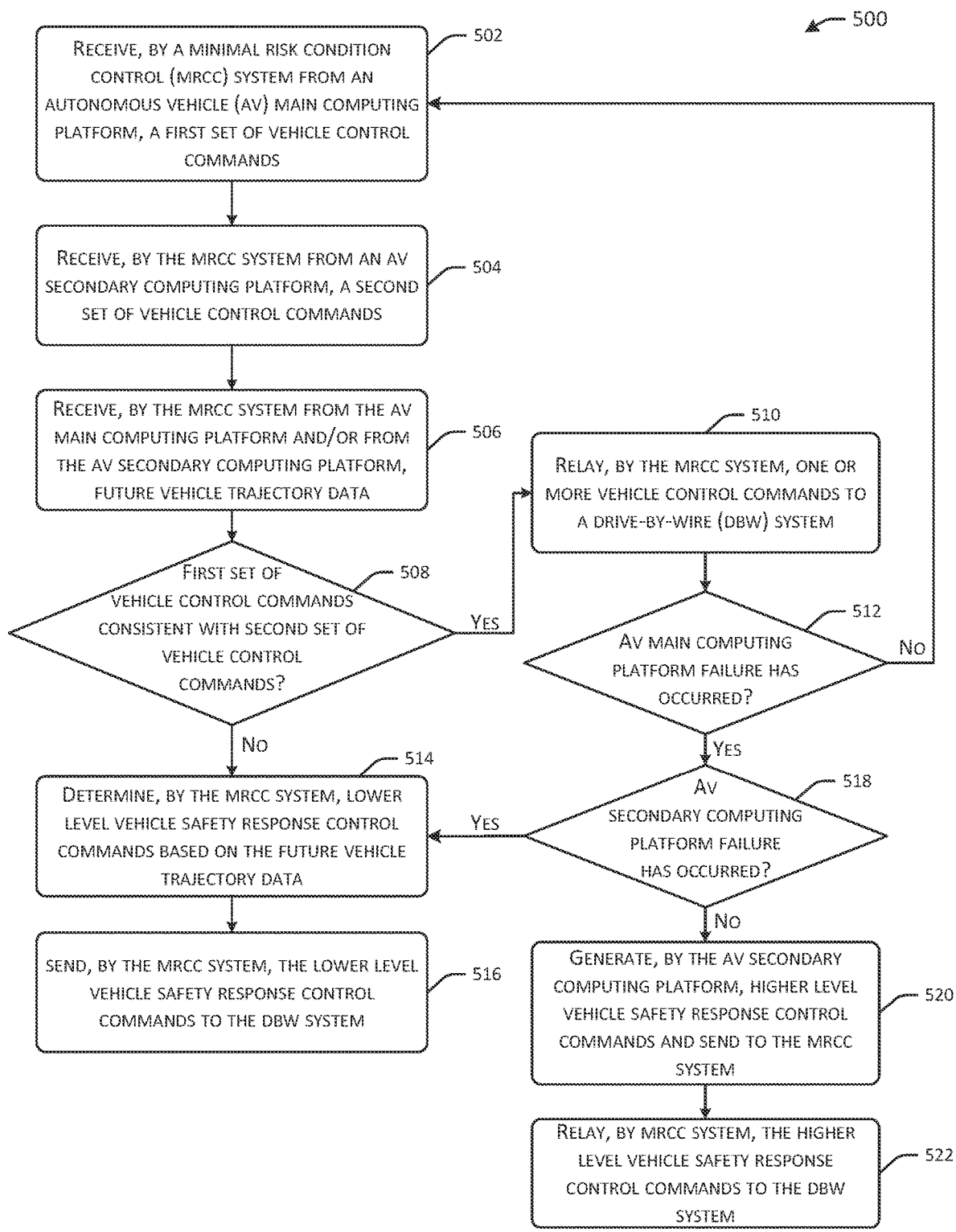
FIG. 5 is a process flow diagram of an illustrative method for initiating vehicle safety response measures by a vehicle safety system within a serial-parallel vehicle computing architecture in response to various safety response trigger events in accordance with example embodiments of the invention.

FIG. 5 is a process flow diagram of an illustrative method 500 for initiating vehicle safety response measures by a vehicle safety system within a serial-parallel vehicle computing architecture in response to various safety response trigger events in accordance with example embodiments of the invention. In example embodiments, the method 500 may be performed by one or more components of the serial-parallel vehicle computing architecture depicted in FIG. 1E or FIG. 1F. For ease of explanation, the example method 500 will be described hereinafter in conjunction with the serial-parallel vehicle computing architecture of FIG. 1E.

At block 502 of the method 500, the MRCC system 104 may receive a first set of vehicle control commands from the main vehicle computing platform 102. At block 504 of the method 500, the MRCC system 104 may receive a second set of vehicle control commands from the secondary vehicle computing platform 120. Further, at block 506 of the method 500, the MRCC system 104 may receive future vehicle trajectory data from the main vehicle computing platform 102 and/or the secondary vehicle computing platform 120.

In example embodiments, the main vehicle computing platform 102 and the secondary vehicle computing platform 120 may each occupy a same (parallel) level in the serialized architecture. In some example embodiments, the secondary vehicle computing platform 120 may perform calculations/processing to generate vehicle control commands that at least partially enable automated driving functions. By virtue of its greater processing capacity/lower processing latency, however, the main vehicle computing platform 102 may perform a greater number and/or more computationally intensive calculations/processing than the secondary vehicle computing platform 120. In some embodiments, at least some of the processing performed by the secondary computing platform 120 may be redundant processing that is also performed by the main vehicle computing platform 102. In other example embodiments, some portion of the processing typically performed by the main vehicle computing platform 102 may be offloaded to the secondary computing platform 102. Processing may be offloaded from the main computing platform 102 to the secondary computing platform 120 to reduce processing latency and/or increase available processing resources of the main computing platform 102. For instance, if performance of the main computing platform 102 becomes degraded, but the main computing platform 102 is still operational and has not failed, then at least some of the processing that would typically be performed by the main computing platform 102 may be offloaded to the secondary computing platform 120.

At block 508 of the method 500, the MRCC system 104 may determine whether the first set of vehicle control commands is consistent with the second set of vehicle control commands. In response to a negative determination at block 508, the MRCC system 104 may be configured to initiate a vehicle safety response measure and generate, at block 514 of the method 500, lower level vehicle safety response control commands based on the future vehicle trajectory it has received. The MRCC system 104 may then send, at block 516 of the method 500, the lower level vehicle safety response control commands to the DBW system 106, which may be configured to interpret and implement the commands to bring the vehicle to an automated safe stop. In some embodiments, the lower level vehicle safety response control commands may include relatively basic steering, throttle, and/or braking control commands that cause the vehicle to come to a safe stop along a planned trajectory indicated by the future vehicle trajectory data.

In some embodiments, the MRCC vehicle safety system 104 may determine that the main computing platform 102 output and the secondary computing platform 120 output are inconsistent if, for example, the control commands received from the main computing platform 102 conflict with the control commands received from the secondary computing platform 120; if the results of sensor data processed by the main computing platform 102 conflict with the results of sensor data processed by the secondary computing platform (e.g., the main computing platform 102 has detected an obstacle but the secondary computing platform 120 has not or vice versa); or the like. Inconsistency between output from the main computing platform 102 and output from the secondary computing platform 120 may indicate a failure of the main computing platform 102 and/or a failure of the secondary computing platform 120. Accordingly, in response to inconsistent output from the main vehicle computing platform 102 and the secondary vehicle computing platform 120, the MRCC vehicle safety system 104 may initiate a vehicle safety response measure to bring the vehicle to a stop in order to, for example, perform diagnostics on the main computing platform 102 and/or the secondary computing platform 120 to attempt to ascertain which platform may have failed and the nature of the cause of the failure.

In example embodiments, a determination that output from the main vehicle computing platform 102 is inconsistent with output from the secondary computing platform 120 may represent a vehicle safety response trigger event that triggers the MRCC system 104 to initiate a vehicle safety response measure. In some example embodiments, upon detecting the inconsistent outputs, the MRCC system 104 may first perform a check to determine if the secondary computing platform 120 has failed, and may only generate the lower level vehicle safety response control commands in the event that the secondary computing platform has failed. Alternatively, if the secondary computing platform 120 maintains at least some threshold level of operational status, the secondary computing platform 120 may be tasked with generating higher level vehicle safety response control commands and sending them to the MRCC system 104 for relay to the DBW system 106.

Referring again to block 508, if the MRCC system 104 does not identify any discrepancy/inconsistency between the first set of vehicle control commands received from the main vehicle computing platform 102 and the second set of vehicle control commands received from the secondary vehicle computing platform 120 (a positive determination at block 508), then the method 500 may proceed to block 510, where the MRCC system 104 may relay the one or more of the received vehicle control commands to the DBW system 106 for implementation. Then, at block 512 of the method 500, the MRCC system 104 may be configured to determine whether main vehicle computing platform 102 has failed. As previously described, the MRCC system 104 may utilize different techniques for determining whether the main computing platform 102 has failed. For instance, the MRCC system 104 may determine that the main vehicle computing platform 102 has failed based on receipt of a failure signal from the main computing platform 102, based on loss of connectivity between the main computing platform 102 and the MRCC system 104, or the like.

In response to a positive determination at block 512 of the method 500 indicating that the main computing platform has failed, the method 500 may proceed to block 518, where the MRCC system 104 may determine whether the secondary vehicle computing platform 120 has failed. The MRCC system 104 may utilize similar techniques to determine whether the secondary computing platform 120 has failed as used to determine that the main computing platform 102 has failed. In the event of a positive determination at block 518 indicating that the secondary computing platform 120 has failed, the method 500 may proceed to block 514, where as described earlier, the MRCC system 104 may proceed to initiate a vehicle safety response measure by generating lower level vehicle safety response control commands. In particular, a positive determination at block 518 may indicate that the main computing platform 102 and the secondary computing platform 120 have simultaneously failed, in which case, the MRCC vehicle safety system 104 may be configured to generate lower level vehicle commands to, for example, bring a vehicle to a stop along a planned trajectory indicated by the future vehicle trajectory data received from the main computing platform 102 and/or the secondary computing platform 120 prior to failure.

On the other hand, in response to a negative determination at block 518 indicating that the secondary computing platform 120 is operational and has not failed, the method 500 may proceed to block 520, where the secondary computing platform 120 may generate one or more higher level vehicle safety response control commands for initiating a vehicle safety response measure in response to the detected failure of the main computing platform 102 and send the generated commands to the MRCC system 104. Then, at block 522 of the method 500, the MRCC system 104 may relay the vehicle safety response control commands received from the secondary computing platform 120 to the DBW system 106 for implementation.

In particular, the secondary computing platform 120 may be configured to handle a greater processing load and/or more computationally intensive tasks than the MRCC vehicle safety system 104, and as such, the secondary vehicle computing platform 120 may be configured to generate, at block 520, one or more vehicle safety response control commands corresponding to higher level (e.g., more complex) vehicle safety response measures in response to failure of the main computing platform 102. Such higher level vehicle safety response measures may include complex vehicle control commands—potentially augmented by sensor data from the auxiliary sensor system 114 and/or from one or more other vehicle sensors 122—that, when implemented by the DBW system 106, cause a vehicle to execute at least one lane change maneuver to bring the vehicle to a stop in a slow lane or a shoulder of a roadway, as shown in FIG. 2D, for example. In particular, the secondary computing platform 120 may utilize IMU data from an IMU of the N-box 116, data from the radar 118, point cloud data from a LiDAR 122, or the like to ensure that a safe trajectory free of obstacles exists for the vehicle to transition from its position at the time of detected failure of the main computing platform 102 to its position at completion of the response safety response measure.

Figure 6:
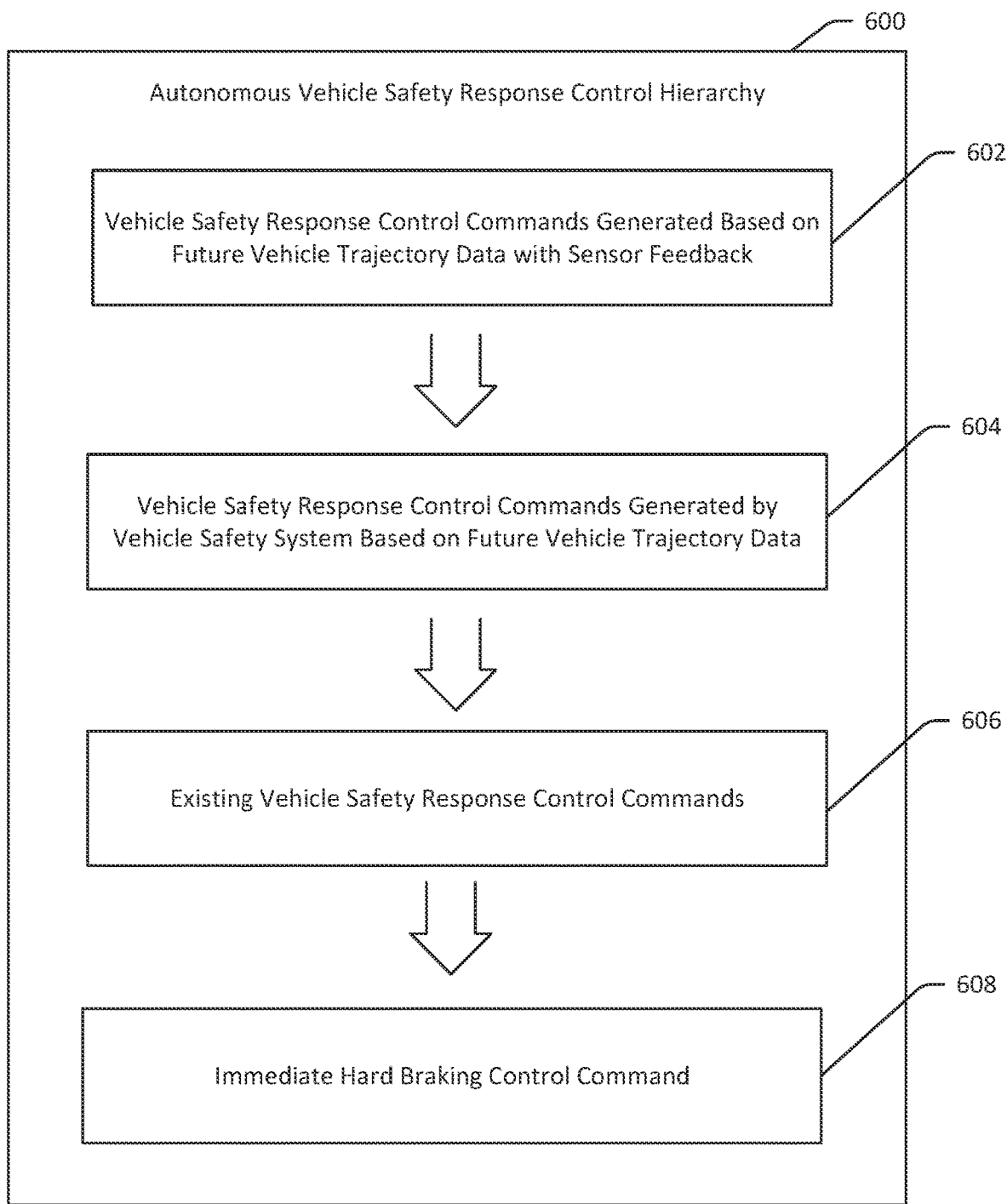
FIG. 6 is a schematic block diagram of an example vehicle safety response control level hierarchy in accordance with example embodiments of the invention.

FIG. 6 is a schematic block diagram of an example vehicle safety response control level hierarchy 600 in accordance with example embodiments of the invention. In example embodiments, a vehicle safety system (e.g., the MRCC system 104, the MRCC subsystem 110) may be associated with a corresponding vehicle safety response control level hierarchy that defines a hierarchy of vehicle safety response control levels capable of being supported by the vehicle safety system. One or more of the vehicle safety response levels in the hierarchy may be associated with a respective one or more vehicle component(s) that need to be operational in order to effectuate vehicle safety response measures corresponding to that vehicle safety response control level.

For instance, taking the MRCC system 104 as an example, the MRCC system 104 may be associated with different vehicle safety response control level hierarchies depending on whether the MRCC system 104 has the capability to augment the vehicle safety response control commands that it generates using sensor data received from one or more sensors (e.g., the auxiliary sensor system 114). More specifically, assuming that the MRCC system 104 receives sensor data from the auxiliary sensor system 114 and/or from one or more other sensors, the MRCC system 104 may be associated with the vehicle safety response control level hierarchy 600 shown in FIG. 6. That is, the highest control level achievable by the MRCC system 104 would be control level 602 according to which the MRCC system 104 would be configured to generate vehicle safety response control commands based on future vehicle trajectory data that is augmented/supplemented with feedback data in the form of sensor data received from one or more sensors.

Even though the highest control level theoretically achievable by the MRCC system 104 may be control level 602, the actual control level achievable by the MRCC system 104 in the hierarchy 600 may depend on the operational status of one or more sensors whose sensor data the MRCC system 104 may use to provide the sensor feedback required at control level 602. In some embodiments, if one or more sensors are not operational (e.g., an IMU of the N-box 116), and thus, cannot provide the MRCC system 104 with sensor data, the MRCC system 104 may select the next highest control level 604 in the hierarchy 600 for initiating its vehicle safety response measure (assuming that any vehicle component(s) need for the vehicle safety response measure at that control level are operational). In the example hierarchy 600 of FIG. 6, the next highest control level 604 in the hierarchy 600 calls for generating vehicle safety response control commands based on the future vehicle trajectory data and does not require any sensors to provide sensor feedback data. Thus, the MRCC system 104 may initiate the vehicle safety response measure at the control level 604 regardless of the operational status of any vehicle sensor.

It should be appreciated, however, that in other example embodiments involving other control level hierarchies, the next highest control level 604 in the hierarchy may also require at least one vehicle component (e.g., at least one sensor) to be operational in order to effectuate a vehicle safety response measure at that control level. Further, in some example embodiments, as long as at least one vehicle component (or some threshold number of vehicle components) are operational among the set of vehicle components corresponding to a particular control level in the hierarchy, the MRCC system 104 may be able to initiate a vehicle safety response measure at that control level. For instance, if an IMU of the N-box 116 fails, but the radar-based sensor 118 is still operational and able to provide sensor data to the MRCC system 104, or vice versa, then the MRCC system 104 may generate augmented vehicle safety response control commands at the control level 602 using whatever sensor data is available as feedback data.

In addition, in some example embodiments, different vehicle safety systems/subsystems within a same computing architecture may be associated with different control level hierarchies. For instance, referring to the example vehicle computing architecture of FIG. 1E, the secondary computing platform 120 may be associated with the control level hierarchy 600 shown in FIG. 6 in which the highest control level 602 corresponds to generating augmented vehicle safety response control commands based on sensor feedback data. In fact, in some embodiments, the secondary computing platform 120 may be associated with an even more enhanced control level hierarchy in which a highest control level permits generated higher level augmented vehicle safety response control commands using sensor feedback data from more advanced sensors (e.g., a LiDAR, a camera, etc.), and a next highest control level permits generated relatively lower level augmented vehicle safety response control commands that utilize sensor feedback data from other relatively less sophisticated sensors (e.g., an IMU). In contrast to the secondary computing platform 120, the MRCC system 104 may be associated with a control hierarchy in which the highest control level theoretically achievable is instead control level 604, for example.

As shown in FIG. 6, the control level hierarchy 600 may include additional control levels below control level 604 in the hierarchy 600. While 4 example control levels are shown as part of the control level hierarchy 600, it should be appreciated that a control level hierarchy may include any number of control levels. Below control level 604 in the hierarchy 600 may be control level 606 according to which the MRCC system 104 sends default vehicle safety response control commands to the DBW system 106. The default vehicle safety response control commands may, for example, have been previously generated by the main computing platform 102 (or the secondary computing platform 120) and sent to the MRCC system 104 along with the future vehicle trajectory data on which such commands may be based. If the MRCC system 104 is not able to implement a vehicle safety response measure in accordance with control level 606, then the MRCC system 104 may fall back to a lowest control level in the hierarchy 600, which may involve sending an emergency hard braking control command to the DBW system 106 to bring the vehicle to an immediate stop. The MRCC system 104 may not be able to implement a vehicle safety response measure at control level 606 if, for example, the MRCC system 104 did not receive or only partially received the default safety response control commands, if the future vehicle trajectory data is incomplete or corrupted in some fashion, or the like. In some embodiments, the MRCC system 106 may fall back on the lowest control level 608 in the hierarchy 600 if a vehicle safety response measure initiated in accordance with a higher control level fails to complete (e.g., fails to bring the vehicle to a complete stop) within a predetermined period of time allotted for completion of the safety response measure. The predetermined allotted period of time may correspond to the period of time over which the future vehicle trajectory data is valid.

Figure 7:
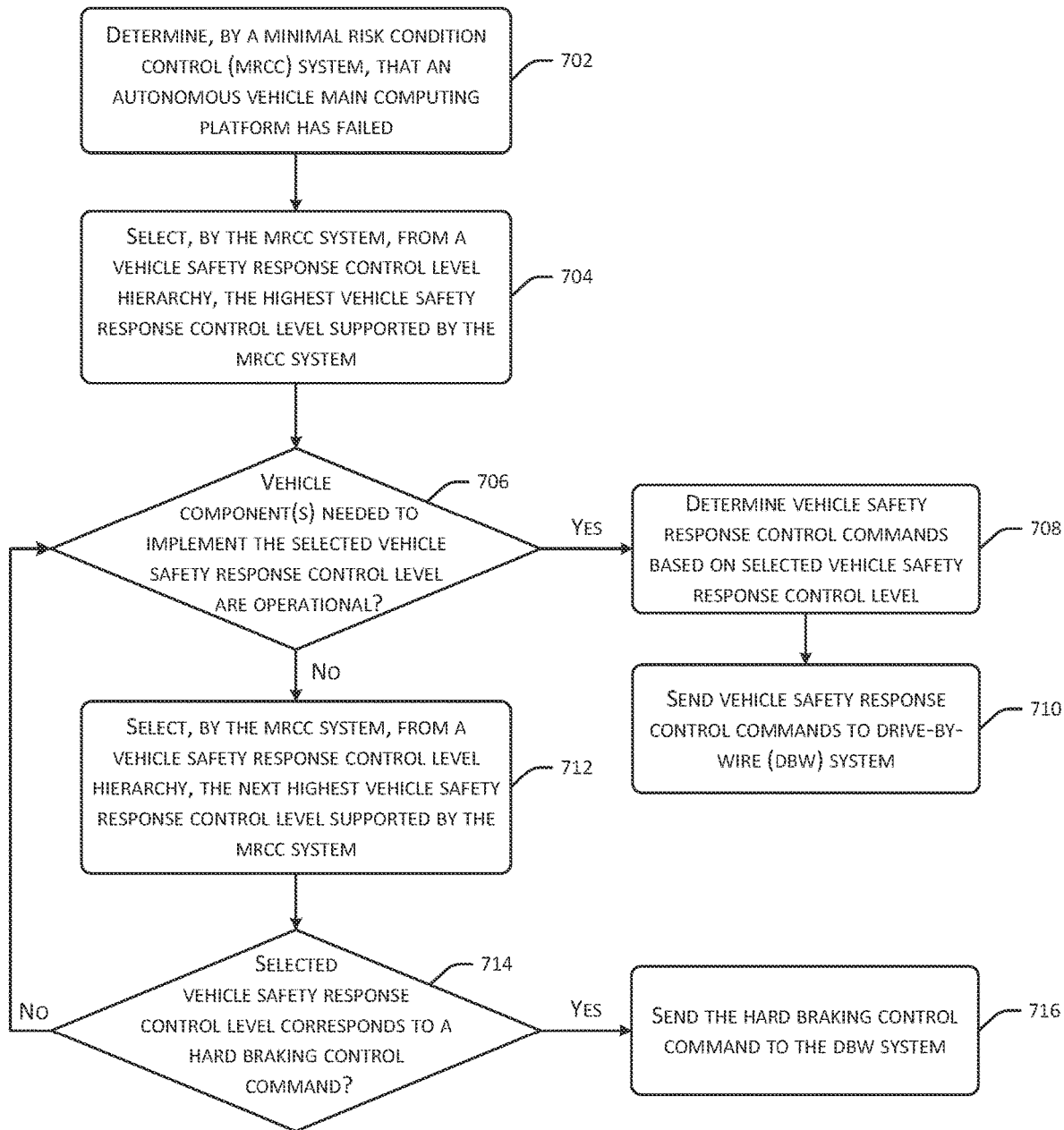
FIG. 7 is a process flow diagram of an illustrative method for iterating through a vehicle safety response control level hierarchy to select a highest control level capable of being implemented by a vehicle safety system based on an operational status of corresponding vehicle component(s) that may be needed to support the control level in accordance with example embodiments of the invention.

FIG. 7 is a process flow diagram of an illustrative method 700 for iterating through a vehicle safety response control level hierarchy to select a highest control level capable of being implemented by a vehicle safety system based on an operational status of corresponding vehicle component(s) that may be needed to support the control level in accordance with example embodiments of the invention. FIG. 7 will be described hereinafter in the context of MRCC system 104 but is equally applicable to MRCC subsystem 110. Moreover, while the example method 700 of FIG. 7 is described in relation to the example control level hierarchy 600, it should be appreciated that the method 700 is applicable to any of variety of different control level hierarchies having any number of control levels.

At block 702 of the method 700, the MRCC system 104 may determine that that a vehicle computing platform (e.g., main computing platform 102) has failed. The MRCC system 104 may utilize any of the previously described techniques to detect failure of the vehicle computing platform 102.

At block 704 of the method 700, the MRCC system 104 may select the highest vehicle safety response control level that the MRCC system 104 is theoretically capable of supporting, assuming that any associated vehicle component(s) needed to support that control level are operational. In those example embodiments in which the MRCC system 104 is communicatively coupled to the auxiliary sensor system 114 and/or one or more other sensors, and thus, able to augment safety response control commands that it generates with sensor data received from such sensors, the control level selected at block 704 may be control level 602. Alternatively, if the MRCC system 104 is not communicatively coupled to any sensors, and thus, not capable of utilizing sensor feedback data, the highest theoretically available control level for the MRCC system 104 may be control level 604, for example.

At block 706 of the method 700, the MRCC system 104 may determine whether one or more vehicle components required to implement a vehicle safety response measure at the highest overall control level in the hierarchy 600 selected at block 704 are operational. For example, if the highest overall control level is control level 602, the MRCC system 104 may determine, at block 706, whether all sensors of the auxiliary sensor system 114 (or some threshold number) are operational. In response to a positive determination at block 706, the method 700 may proceed to block 708, where the MRCC system 104 may determine vehicle safety response control commands based on the selected control level (which at this stage in the iterative process of method 700 is the highest overall control level 602 in the hierarchy 600). Then, at block 710 of the method 700, the MRCC system 104 may send the control commands generated at block 708 to the DBW system 106 for implementation.

On the other hand, in response to a negative determination at block 706 indicating that one or more vehicle components (e.g., vehicle sensor(s)) that support vehicle safety response measure(s) at the selected control level are not operational, the method 700 may proceed to block 712, where the MRCC system 104 may select a next highest control level in the hierarchy 600. Then, at block 714 of the method 700, the MRCC system 104 may determine whether the next highest control level selected at block 712 is a lowest overall control level in the hierarchy such as an emergency hard braking operation. In response to a positive determination at block 714, the MRCC system 104 may send the emergency hard braking control command to the DBW system 106 at block 716 of the method 700. On the other hand, in response to a negative determination at block 714—which indicates that the next highest control level selected at block 712 is not the lowest overall control level in the hierarchy 600—the method 700 may proceed again from block 706. It should be appreciated that, in some embodiments, a positive determination at block 706 may only require determining that a currently selected control level does not rely on any other vehicle components being operational in order to support vehicle safety response measures at that control level. In example embodiments, the method 700 may proceed iteratively until a control level is identified for which any associated required vehicle component(s) are in operational status or until the control level selected corresponds to a lowest control level in the control level hierarchy 600.

Embodiments of the invention overcome technical problems specifically arising in the realm of computer-based technology, and more specifically in some example embodiments, in the realm of autonomous vehicle technology. In particular, example embodiments of the invention provide technical solutions to the technical problem of how to bring a vehicle to a safe stop in an automated manner without the aid of human manual input in the event of a critical vehicle component failure such as failure of vehicle computing unit. More specifically, example embodiments of the invention provide technical solutions to this technical problem in the form of vehicle safety systems capable of implementing various vehicle safety response measures in response to detected failure of vehicle computing unit, where such safety response measures are facilitated by various types of serialized and/or serial-parallel computing architectures in which the vehicle safety systems are implemented. Example embodiments of the invention also provide technical solutions to the above-described technical problem in the form of vehicle safety systems that are capable of generating augmented vehicle safety response control commands based on sensor feedback data and that are capable of selecting a control level from a control level hierarchy and initiating a corresponding vehicle safety response.

Hardware Implementation

Figure 8:
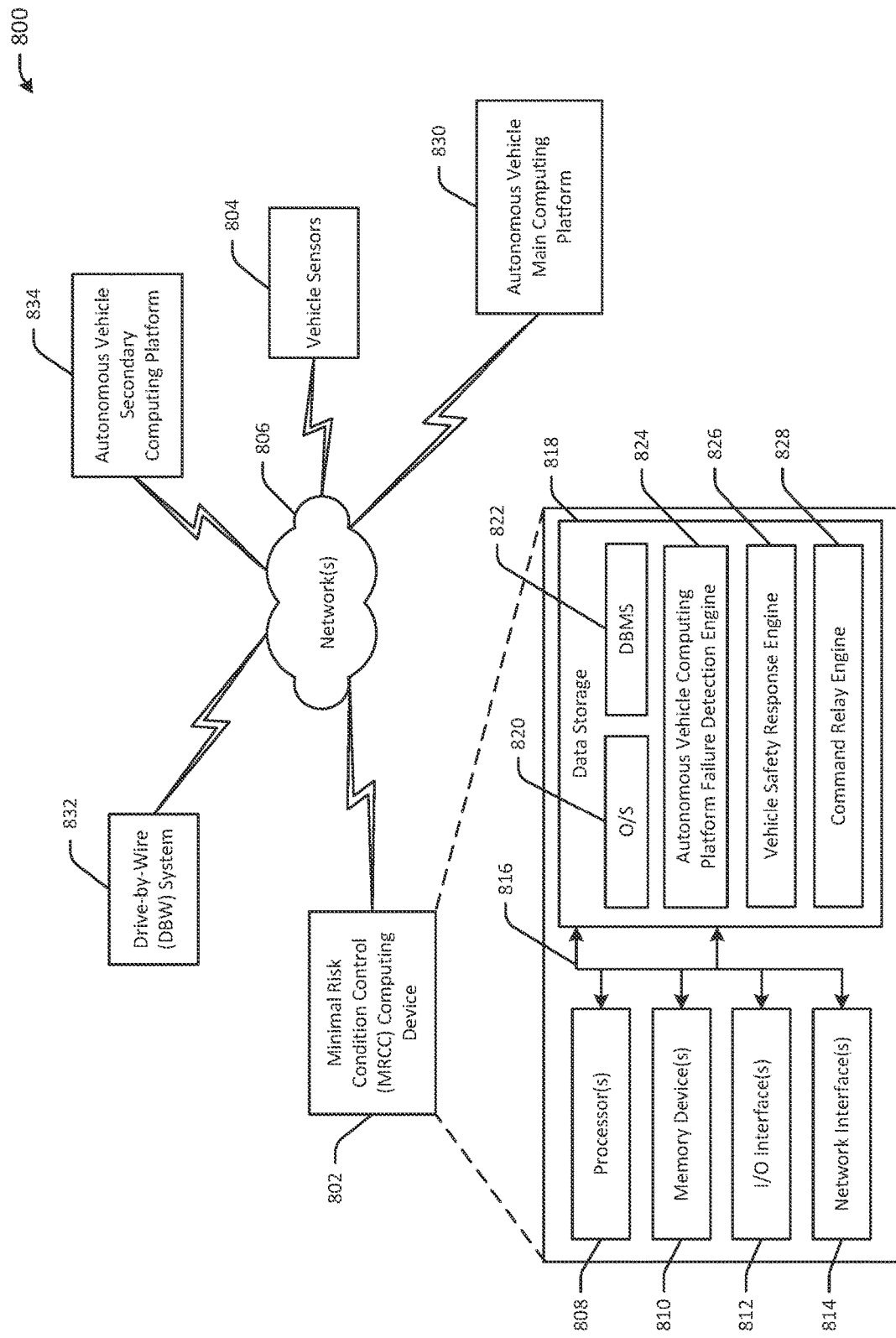
FIG. 8 is a schematic block diagram illustrating an example networked architecture configured to implement example embodiments of the invention.

FIG. 8 is a schematic block diagram illustrating an example networked architecture 800 configured to implement example embodiments of the invention. The networked architecture 800 can include one or more special-purpose computing devices 802 communicatively coupled via one or more networks 806 to various vehicle sensors 804, a main computing platform 830 (e.g., the main computing platform 102), a secondary computing platform 834 (e.g., the secondary computing platform 120), and a DBW system 832 (e.g., the DBW system 106 or the DBW subsystem 112).

The vehicle sensors 804 may include any of the types of sensors that may be included in the auxiliary sensor system 114 as well as one or more other types of sensors including, without limitation, an IMU, a radar-based sensor, a LiDAR, a camera, a Global Positioning System (GPS) receiver, a sonar-based sensor, an ultrasonic sensor, a FIR sensor, or the like. The special-purpose computing device(s) 802 may form part of the MRCC system 104 or the MRCC subsystem 110, and in some example embodiments, may be communicatively coupled to one or more of the sensors 804 via one or more of the network(s) 806, in which case, the device 802 may be able to generate augmented vehicle safety response control commands based on the received sensor data. In some example embodiments, one or more special-purpose computing device(s) 802 may be provided remotely from a vehicle and may receive data from the sensors 804 via one or more long-range networks.

The special-purpose computing device(s) 802 may be hard-wired to perform the techniques; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 802 may also combine custom hard-wired logic, ASICs, or FPGAs with custom programming to accomplish the techniques. The special-purpose computing device(s) 802 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 820, including mobile operating systems such as iOS, Android, Chrome OS, or the like, desktop operating systems, mainframe operating systems, or other compatible operating systems. In other embodiments, the computing device(s) 402 may be controlled by a proprietary operating system. The operating system software 420 may control and schedule computer processes for execution; perform memory management; provide file system, networking, and I/O services; and provide user interface functionality, such as a graphical user interface ("GUI").

While the computing device(s) 80 and/or the sensors 804 may be described herein in the singular, it should be appreciated that multiple instances of any such component can be provided and functionality described in connection any particular component can be distributed across multiple instances of such a component. In certain example embodiments, functionality described herein in connection with any given component of the architecture 800 can be distributed among multiple components of the architecture 800. For example, at least a portion of functionality described as being provided by a computing device 802 may be distributed among multiple such computing devices 802. In addition, it should be appreciated that the main computing platform 830 and/or the secondary vehicle computing platform 834 may include any number of constituent computing devices, processing units, or the like.

The network(s) 806 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 806 can have any suitable communication range associated therewith and can include, for example, global networks (e.g., the Internet), metropolitan area networks (MANs), wide area networks (WANs), local area networks (LANs), or personal area networks (PANs). In addition, the network(s) 806 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 802 can include one or more processors (processor(s)) 808, one or more memory devices 810 (generically referred to herein as memory 810), one or more input/output ("I/O") interface(s) 812, one or more network interfaces 814, and data storage 818. The computing device 802 can further include one or more buses 816 that functionally couple various components of the computing device 802. The data storage may store one or more engines, program modules, components, or the like including, without limitation, a failure detection engine 824, a vehicle safety response engine 826, and a command relay engine 828. Each of the engines/components depicted in FIG. 8 may include logic for performing any of the processes or tasks described earlier in connection with correspondingly named engines/components. In certain example embodiments, any of the depicted engines/components may be implemented in hard-wired circuitry within digital electronic devices such as one or more ASICs or FPGAs that are persistently programmed to perform corresponding techniques.

The bus(es) 816 can include at least one of a system bus, a memory bus, an address bus, or a message bus, and can permit the exchange of information (e.g., data (including computer-executable code), signaling, etc.) between various components of the computing device 802. The bus(es) 816 can include, without limitation, a memory bus or a memory controller, a peripheral bus, an accelerated graphics port, and so forth. The bus(es) 816 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 810 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 810 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 810 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 818 can include removable storage and/or non-removable storage including, but not limited to, magnetic storage, optical disk storage, and/or tape storage. The data storage 818 can provide non-volatile storage of computer-executable instructions and other data. The memory 810 and the data storage 818, removable and/or non-removable, are examples of computer-readable storage media (CRSM) as that term is used herein. The data storage 818 can store computer-executable code, instructions, or the like that can be loadable into the memory 810 and executable by the processor(s) 808 to cause the processor(s) 808 to perform or initiate various operations. The data storage 818 can additionally store data that can be copied to memory 810 for use by the processor(s) 808 during the execution of the computer-executable instructions. Moreover, output data generated as a result of execution of the computer-executable instructions by the processor(s) 808 can be stored initially in memory 810 and can ultimately be copied to data storage 818 for non-volatile storage.

More specifically, the data storage 818 can store one or more operating systems (O/S) 820 and one or more database management systems (DBMS) 822 configured to access the memory 810 and/or one or more external datastore(s) (not depicted) potentially via one or more of the networks 806. In addition, the data storage 818 may further store one or more program modules, applications, engines, computer-executable code, scripts, or the like. For instance, any of the engines/components depicted in FIG. 8 may be implemented as software and/or firmware that includes computer-executable instructions (e.g., computer-executable program code) loadable into the memory 810 for execution by one or more of the processor(s) 808 to perform any of the techniques described herein.

Although not depicted in FIG. 8, the data storage 818 can further store various types of data utilized by engines/components of the computing device 802. Such data may include, without limitation, any of the types of data illustratively shown as being stored in the datastore(s) 212. Any data stored in the data storage 818 can be loaded into the memory 810 for use by the processor(s) 808 in executing computer-executable program code. In addition, any data stored in the data storage 818 can potentially be stored in one or more external datastores that are accessible via the DBMS 822 and loadable into the memory 810 for use by the processor(s) 808 in executing computer-executable instructions/program code. The data storage 818 may include the datastore(s) 212 or the datastore(s) 212 may be external to the data storage 818.

The processor(s) 808 can be configured to access the memory 810 and execute computer-executable instructions/program code loaded therein. For example, the processor(s) 808 can be configured to execute computer-executable instructions/program code of the various engines/components stored in the data storage 818 to cause or facilitate various operations to be performed in accordance with one or more embodiments of the invention. The processor(s) 808 can include any suitable processing unit capable of accepting data as input, processing the input data in accordance with stored computer-executable instructions, and generating output data. The processor(s) 808 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 808 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 808 can be made capable of supporting any of a variety of instruction sets.

Referring now to other illustrative components depicted as being stored in the data storage 818, the O/S 820 can be loaded from the data storage 818 into the memory 810 and can provide an interface between other application software executing on the computing device 802 and hardware resources of the computing device 802. More specifically, the O/S 820 can include a set of computer-executable instructions for managing hardware resources of the computing device 802 and for providing common services to other application programs. In certain example embodiments, the O/S 820 can include or otherwise control execution of one or more of the engines/program modules stored in the data storage 818. The O/S 820 can include any operating system now known or which can be developed in the future including, but not limited to, any other proprietary or non-proprietary operating system.

The DBMS 822 can be loaded into the memory 810 and can support functionality for accessing, retrieving, storing, and/or manipulating data stored in the memory 810, data stored in the data storage 818, and/or data stored in external datastore(s). The DBMS 822 can use any of a variety of database models (e.g., relational model, object model, etc.) and can support any of a variety of query languages. The DBMS 822 can access data represented in one or more data schemas and stored in any suitable data repository. Datastore(s) that may be accessible by the computing device 802 via the DBMS 822, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 802, the input/output (I/O) interface(s) 812 can facilitate the receipt of input information by the computing device 802 from one or more I/O devices as well as the output of information from the computing device 802 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 802 or can be separate therefrom. The I/O devices can further include, for example, any number of peripheral devices such as data storage devices, printing devices, and so forth.

The I/O interface(s) 812 can also include an interface for an external peripheral device connection such as universal serial bus (USB), FireWire, Thunderbolt, Ethernet port or other connection protocol that can connect to one or more networks. The I/O interface(s) 812 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 802 can further include one or more network interfaces 814 via which the computing device 802 can communicate with any of a variety of other systems, platforms, networks, devices, and so forth. The network interface(s) 814 can enable communication, for example, with the sensors 804 and/or one or more other devices via one or more of the network(s) 806. In example embodiments, the network interface(s) 814 provide a two-way data communication coupling to one or more network links that are connected to one or more of the network(s) 806. For example, the network interface(s) 814 may include an integrated services digital network (ISDN) card, a cable modem, a satellite modem, or a modem to provide a data communication connection to a corresponding type of telephone line. As another non-limiting example, the network interface(s) 814 may include a local area network (LAN) card to provide a data communication connection to a compatible LAN (or a wide area network (WAN) component to communicate with a WAN). Wireless links may also be implemented. In any such implementation, the network interface(s) 814 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 804 and the signals on network links and through the network interface(s) 814, which carry the digital data to and from the computing device 802, are example forms of transmission media. In example embodiments, the computing device 802 can send messages and receive data, including program code, through the network(s) 806, network links, and network interface(s) 814. For instance, in the Internet example, a server might transmit a requested code for an application program through the Internet, the ISP, a local network, and a network interface 814. The received code may be executed by a processor 808 as it is received, and/or stored in the data storage 818, or other non-volatile storage for later execution.

It should be appreciated that the engines depicted in FIG. 8 as part of the computing device 802 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 802 and/or hosted on other computing device(s) (e.g., 802) accessible via one or more of the network(s) 802, can be provided to support functionality provided by the engines depicted in FIG. 8 and/or additional or alternate functionality. In addition, engines that support functionality described herein can be implemented, at least partially, in hardware and/or firmware and can be executable across any number of computing devices 802 in accordance with any suitable computing model such as, for example, a client-server model, a peer-to-peer model, and so forth.

It should further be appreciated that the computing device 802 can include alternate and/or additional hardware, software, and/or firmware components beyond those described or depicted without departing from the scope of the invention. More particularly, it should be appreciated that software, firmware, and/or hardware components depicted as forming part of the computing device 802 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 802. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method, comprising:
    receiving, by one or more processors of a vehicle, future vehicle trajectory data from a vehicle computing platform of the vehicle, the future vehicle trajectory data indicating a planned trajectory of the vehicle for a period of time subsequent to a time of receipt of the future vehicle trajectory data;
    determining, by the one or more processors, that the vehicle computing platform has failed;
    determining, by the one or more processors, a set of vehicle safety response control commands based at least in part on the future vehicle trajectory data;
    sending, by the one or more processors, the set of vehicle safety response control commands to one or more actuators of the vehicle to initiate a safety response measure for the vehicle in response to failure of the vehicle computing platform;
    during a period of time in which the safety response measure is undertaken, continuously receiving over time, at the one or more processors, sensor data from one or more sensors of the vehicle, wherein the one or more sensors comprise an inertial sensor, wherein the sensor data comprises first sensor data from the inertial sensor, the first sensor data comprising linear velocity, linear position, angular rate, and angular orientation, and indicating actual vehicle trajectory data;
    updating the set of vehicle safety response control commands based on any deviation between the actual vehicle trajectory data and the planned trajectory; and
    transmitting the updated set of vehicle safety response control commands to the one or more actuators.

2. The computer-implemented method of claim 1, wherein determining that the vehicle computing platform has failed comprises receiving, by the one or more processors from the vehicle computing platform, a failure signal indicating that the vehicle computing platform has failed.

3. The computer-implemented method of claim 1, wherein determining that the vehicle computing platform has failed comprises determining, by the one or more processors, that connectivity between the vehicle safety system and the vehicle computing platform has been lost for at least a threshold period of time.

4. The computer-implemented method of claim 1, wherein determining the set of vehicle safety response control commands comprises processing the future vehicle trajectory data at the vehicle safety system to generate the set of vehicle safety response commands.

5. The computer-implemented method of claim 1, wherein updating the set of vehicle safety response control commands comprises:
    determining, by the one or more processors, a current location of the vehicle using the first sensor data;
    determining, by the one or more processors and based at least in part on the future vehicle trajectory data, that the current location of the vehicle deviates from an expected location of the vehicle; and
    modifying, by the one or more processors, a vehicle steering control command of the set of vehicle safety response control commands to obtain an updated vehicle steering control command of the set of updated vehicle safety response control commands, wherein the updated vehicle steering control command, when implemented, causes the one or more actuators to adjust a steering control for the vehicle to reduce the deviation between the current location of the vehicle and the expected location of the vehicle.

6. The computer-implemented method of claim 5, wherein the expected location of the vehicle corresponds to a center of a lane of a roadway being traversed by the vehicle, and wherein the updated vehicle steering control command, when implemented, causes the one or more actuators to adjust the steering control to move the vehicle from the current location of the vehicle towards the center of the lane.

7. The computer-implemented method of claim 1, wherein the one or more sensors comprise a radar-based sensor, wherein the sensor data comprises second sensor data received from the radar-based sensor, and wherein updating the set of vehicle safety response control commands comprises:
    determining, by the one or more processors and using the first sensor data, that an obstacle is present along a planned trajectory of the vehicle indicated by the future vehicle trajectory data; and modifying, by the one or more processors, one or more control commands of the set of vehicle safety response control commands to obtain one or more updated vehicle safety response control commands of the set of updated vehicle safety response control commands, wherein the one or more updated vehicle safety response control commands, when implemented, cause the one or more actuators to adjust at least one of a steering control or a braking control for the vehicle to cause the vehicle to deviate from the planned trajectory in order to avoid the obstacle.

8. The computer-implemented method of claim 1, further comprising prior to determining that the vehicle computing platform has failed:

receiving, by the one or more processors, a set of vehicle control commands from the vehicle computing platform; and relaying, by the one or more processors, the set of vehicle control commands to the one or more actuators.

9. The computer-implemented method of claim 1, wherein the one or more processors comprise a minimal risk condition control (MRCC) vehicle safety system.

10. The computer-implemented method of claim 9, wherein the one or more actuators comprises a drive-by-wire (DBW) actuator.

11. The computer-implemented method of claim 10, wherein the MRCC vehicle safety system and the DBW actuator constitute part of an integrated system, and wherein the MRCC vehicle safety system communicates with the DBW actuator using a proprietary vehicle communication protocol.

12. The computer-implemented method of claim 1, wherein the vehicle computing platform is a primary computing platform of the vehicle.

13. A system for automated control of a vehicle, comprising:

a vehicle computing platform;
one or more actuators; and
at least one processor; and
at least one memory storing computer-executable instructions, wherein the at least one processor is configured to access the at least one memory and execute the computer-executable instructions to:
receive future vehicle trajectory data from the vehicle computing platform, the future vehicle trajectory data indicating a planned trajectory of the vehicle for a period of time subsequent to a time of receipt of the future vehicle trajectory data;
determine that the vehicle computing platform has failed;
determine a set of vehicle safety response control commands based at least in part on the future vehicle trajectory data;
send the set of vehicle safety response control commands to the one or more actuators to initiate an automated safety response measure for the vehicle in response to failure of the vehicle computing platform;
during a period of time in which the safety response measure is undertaken, continuously receiving over time, at the one or more processors, sensor data from one or more sensors of the vehicle, wherein the one or more sensors comprise an inertial sensor, wherein the sensor data comprises first sensor data from the inertial sensor, the first sensor data comprising linear velocity, linear position, angular rate, and angular orientation, and indicating actual vehicle trajectory data;
updating the set of vehicle safety response control commands based on any deviation between the actual vehicle trajectory data and the planned trajectory; and
transmitting the updated set of vehicle safety response control commands to the one or more actuators.

14. The system of claim 13, wherein the at least one processor is configured to determine that the vehicle computing platform has failed by executing the computer-executable instructions to perform one of:

receive, from the vehicle computing platform, a failure signal indicating that the vehicle computing platform has failed, or determine that connectivity between the at least one processor and the vehicle computing platform has been lost for at least a threshold period of time.

15. The system of claim 13, wherein the at least one processor is configured to update the set of vehicle safety response control commands by executing the computer-executable instructions to:

determine a current location of the vehicle using the first sensor data;

determine, based at least in part on the future vehicle trajectory data, that the current location of the vehicle deviates from an expected location of the vehicle; and modify a vehicle steering control command of the set of vehicle safety response control commands to obtain an updated vehicle steering control command of the set of updated vehicle safety response control commands, wherein the updated vehicle steering control command, when implemented, causes the vehicle actuation system to adjust a steering control for the vehicle to reduce the deviation between the current location of the vehicle and the expected location of the vehicle.

16. The system of claim 13, wherein the one or more sensors comprise a radar-based sensor, wherein the sensor data comprises second sensor data received from the radar-based sensor, and wherein the at least one processor is configure to update the set of vehicle safety response control commands by executing the computer-executable instructions to:

determine, using the second sensor data, that an obstacle is present along a planned trajectory of the vehicle indicated by the future vehicle trajectory data; and modify one or more control commands of the set of vehicle safety response control commands to obtain one or more updated vehicle safety response control commands of the set of updated vehicle safety response control commands, wherein the one or more updated vehicle safety response control commands, when implemented, cause the one or more actuators to adjust at least one of a steering control or a braking control for the vehicle to cause the vehicle to deviate from the planned trajectory in order to avoid the obstacle.

17. The computer-implemented method of claim 1, further comprising:

deleting any of the previously received future vehicle trajectory data once the previously received future vehicle trajectory data represents data at a current or previous time period in an absence of a failure of the vehicle computing platform.

18. The computer-implemented method of claim 1, wherein the vehicle platform comprises a main vehicle platform and a secondary vehicle platform; and the determining of the set of vehicle safety response control commands comprises determining whether first commands from the main vehicle platform are inconsistent with second commands from the secondary vehicle platform; and in response to determining that the first commands are inconsistent with the second commands, determining the set of vehicle safety response control commands from steering, throttling, and braking controls without lane changes; and in response to determining that the first commands are consistent with the second commands, determining the set of vehicle safety response control commands as the first commands or the second commands.

* * * * *